United States Patent
Allegretti et al.

(10) Patent No.: US 10,759,610 B1
(45) Date of Patent: Sep. 1, 2020

(54) BULK MATERIAL CONVEYOR

(71) Applicant: SANDBOX LOGISTICS, LLC, Houston, TX (US)

(72) Inventors: C. John Allegretti, Barrington Hills, IL (US); Kevin S. Corrigan, Forest Park, IL (US); Angelo L. Flamingo, Ottawa, IL (US)

(73) Assignee: SANDBOX LOGISTICS, LLC, Houston, TX (US)

( * ) Notice: Subject to any disclaimer, the term of this patent is extended or adjusted under 35 U.S.C. 154(b) by 0 days.

(21) Appl. No.: 16/402,663

(22) Filed: May 3, 2019

(51) Int. Cl.
  *B65G 47/16* (2006.01)
  *B65G 15/00* (2006.01)
  *B65G 47/18* (2006.01)
  *B65G 15/08* (2006.01)

(52) U.S. Cl.
  CPC ............ *B65G 47/16* (2013.01); *B65G 15/00* (2013.01); *B65G 15/08* (2013.01); *B65G 47/18* (2013.01); *B65G 2201/04* (2013.01)

(58) Field of Classification Search
  CPC ........ B65G 47/18; B65G 47/19; B65G 47/20; B65G 15/40; B65G 15/08; B65G 41/002; B65G 41/005; B65G 41/006; B65G 65/005; B65G 65/00; B65G 65/40; B65G 15/30; B65D 88/32; B65D 90/20; B65D 90/54
  USPC ............. 198/861.1, 861.3, 818–830, 550.01, 198/550.2, 317
  See application file for complete search history.

(56) References Cited

U.S. PATENT DOCUMENTS

| | | |
|---|---|---|
| 710,611 A | 10/1902 | Ray |
| 917,649 A | 4/1909 | Otto |
| 2,385,245 A | 9/1945 | Victor |
| 2,563,470 A | 8/1951 | Kane |
| 2,652,174 A | 9/1953 | West et al. |
| 2,670,866 A | 3/1954 | David |
| 2,678,737 A | 5/1954 | Mangrum |
| 2,802,603 A | 8/1957 | Cecil |
| 2,873,048 A * | 2/1959 | Gear ................. B65G 11/026 222/1 |
| 3,049,248 A | 8/1962 | Heltzel et al. |
| 3,083,879 A | 4/1963 | Coleman |
| 3,151,779 A | 10/1964 | Rensch et al. |
| 3,318,473 A | 5/1967 | Jones et al. |
| 3,343,688 A | 9/1967 | Arnold |

(Continued)

FOREIGN PATENT DOCUMENTS

| | | |
|---|---|---|
| EP | 2937826 A1 | 10/2015 |
| GB | 2066220 A | 7/1981 |

(Continued)

*Primary Examiner* — James R Bidwell
(74) *Attorney, Agent, or Firm* — Lorenz & Kopf LLP

(57) ABSTRACT

A bulk material shipping conveyor including a support assembly, a housing connected to the support assembly, a conveyor belt assembly partially positioned in the housing, a motor assembly coupled to the conveyor belt assembly, a hopper assembly including a receiving assembly including a plurality of walls and at least one movable flap extending above at least one of the plurality of walls, a gate assembly including a door movable between an open position and a closed position, and a transition assembly including a plurality of spaced apart conveyor supports, wherein at least one of the spaced apart conveyor supports is rotated relative to a longitudinal axis of the housing.

20 Claims, 18 Drawing Sheets

(56) References Cited

U.S. PATENT DOCUMENTS

| | | |
|---|---|---|
| 3,354,918 A | 11/1967 | Coleman |
| 3,476,270 A | 11/1969 | Cox et al. |
| 3,602,400 A | 8/1971 | Cooke |
| 3,785,534 A | 1/1974 | Smith |
| 3,802,584 A | 4/1974 | Sackett et al. |
| 3,986,708 A | 10/1976 | Heltzel et al. |
| 4,023,719 A | 5/1977 | Noyon |
| 4,058,239 A | 11/1977 | Van |
| 4,178,117 A | 12/1979 | Brugler |
| 4,204,773 A | 5/1980 | Bates |
| 4,258,953 A | 3/1981 | Johnson |
| 4,313,708 A | 2/1982 | Tiliakos |
| 4,398,653 A | 8/1983 | Daloisio |
| 4,626,166 A | 12/1986 | Jolly |
| 4,701,095 A | 10/1987 | Berryman et al. |
| 4,856,681 A | 8/1989 | Murray |
| 4,956,821 A | 9/1990 | Fenelon |
| 4,993,883 A | 2/1991 | Jones |
| 5,036,979 A | 8/1991 | Selz |
| 5,096,096 A | 3/1992 | Calaunan |
| 5,339,996 A | 8/1994 | Dubbert et al. |
| 5,375,730 A | 12/1994 | Bahr et al. |
| 5,413,154 A | 5/1995 | Hurst et al. |
| 5,441,321 A | 8/1995 | Karpisek |
| 5,445,289 A | 8/1995 | Owen |
| 5,722,552 A | 3/1998 | Olson |
| 5,913,459 A | 6/1999 | Gill et al. |
| 5,927,356 A | 7/1999 | Henderson |
| 5,944,470 A | 8/1999 | Bonerb |
| 5,997,099 A | 12/1999 | Collins |
| 6,059,372 A | 5/2000 | Mcdonald et al. |
| 6,247,594 B1 | 6/2001 | Garton |
| 6,283,269 B1 * | 9/2001 | Mayer ............... B65G 41/005 198/313 |
| 6,537,015 B2 | 3/2003 | Lim et al. |
| 6,568,567 B2 | 5/2003 | Mckenzie et al. |
| 6,622,849 B1 * | 9/2003 | Sperling ............. B65D 90/623 198/532 |
| 7,008,163 B2 | 3/2006 | Russell |
| 7,086,342 B2 | 8/2006 | Oneall et al. |
| 7,100,896 B1 | 9/2006 | Cox |
| 7,252,309 B2 | 8/2007 | Goh et al. |
| 7,284,579 B2 | 10/2007 | Elgan et al. |
| 7,467,707 B1 * | 12/2008 | Gabhart ............... B65G 15/62 198/818 |
| 7,475,796 B2 | 1/2009 | Garton |
| 7,500,817 B2 | 3/2009 | Furrer et al. |
| 7,762,281 B2 | 7/2010 | Schuld |
| 7,997,213 B1 | 8/2011 | Gauthier et al. |
| 8,387,824 B2 | 3/2013 | Wietgrefe |
| 8,434,990 B2 | 5/2013 | Claussen |
| D688,349 S | 8/2013 | Oren et al. |
| D688,350 S | 8/2013 | Oren et al. |
| D688,351 S | 8/2013 | Oren et al. |
| D688,772 S | 8/2013 | Oren et al. |
| 8,505,780 B2 | 8/2013 | Oren |
| 8,545,148 B2 | 10/2013 | Wanek-pusset et al. |
| 8,573,917 B2 | 11/2013 | Renyer |
| 8,585,341 B1 | 11/2013 | Oren et al. |
| 8,607,289 B2 | 12/2013 | Brown et al. |
| 8,616,370 B2 | 12/2013 | Allegretti et al. |
| 8,622,251 B2 | 1/2014 | Oren |
| 8,668,430 B2 | 3/2014 | Oren et al. |
| D703,582 S | 4/2014 | Oren |
| 8,827,118 B2 | 9/2014 | Oren |
| 8,887,914 B2 | 11/2014 | Allegretti et al. |
| RE45,713 E | 10/2015 | Oren et al. |
| 9,162,603 B2 | 10/2015 | Oren |
| RE45,788 E | 11/2015 | Oren et al. |
| 9,248,772 B2 | 2/2016 | Oren |
| RE45,914 E | 3/2016 | Oren et al. |
| 9,296,518 B2 | 3/2016 | Oren |
| 9,309,064 B2 | 4/2016 | Sheesley |
| 9,340,353 B2 | 5/2016 | Oren et al. |
| 9,358,916 B2 | 6/2016 | Oren |
| 9,394,102 B2 | 7/2016 | Oren et al. |
| 9,403,626 B2 | 8/2016 | Oren |
| 9,421,899 B2 | 8/2016 | Oren |
| 9,440,785 B2 | 9/2016 | Oren et al. |
| 9,446,801 B1 | 9/2016 | Oren |
| 9,475,661 B2 | 10/2016 | Oren |
| 9,511,929 B2 | 12/2016 | Oren |
| 9,522,816 B2 | 12/2016 | Taylor |
| 9,527,664 B2 | 12/2016 | Oren |
| 9,580,238 B2 | 2/2017 | Friesen et al. |
| RE46,334 E | 3/2017 | Oren et al. |
| D780,883 S | 3/2017 | Schaffner et al. |
| D783,771 S | 4/2017 | Stegemoeller et al. |
| D783,772 S | 4/2017 | Stegemoeller, III et al. |
| 9,617,066 B2 | 4/2017 | Oren |
| 9,624,030 B2 | 4/2017 | Oren et al. |
| 9,624,036 B2 | 4/2017 | Luharuka et al. |
| 9,643,774 B2 | 5/2017 | Oren |
| 9,650,216 B2 | 5/2017 | Allegretti |
| 9,656,799 B2 | 5/2017 | Oren et al. |
| 9,669,993 B2 | 6/2017 | Oren et al. |
| 9,670,752 B2 | 6/2017 | Glynn et al. |
| 9,676,554 B2 | 6/2017 | Glynn et al. |
| 9,682,815 B2 | 6/2017 | Oren |
| 9,694,970 B2 | 7/2017 | Oren et al. |
| 9,701,463 B2 | 7/2017 | Oren et al. |
| 9,718,609 B2 | 8/2017 | Oren et al. |
| 9,718,610 B2 | 8/2017 | Oren |
| 9,725,233 B2 | 8/2017 | Oren et al. |
| 9,725,234 B2 | 8/2017 | Oren et al. |
| 9,738,439 B2 | 8/2017 | Oren et al. |
| RE46,531 E | 9/2017 | Oren et al. |
| 9,758,081 B2 | 9/2017 | Oren |
| 9,771,224 B2 | 9/2017 | Oren et al. |
| 9,840,366 B2 | 12/2017 | Oren et al. |
| 9,975,712 B2 | 5/2018 | Friesen |
| D824,131 S | 7/2018 | Friesen |
| D860,575 S | 9/2019 | Friesen |
| 10,414,319 B2 | 9/2019 | Friesen |
| 2005/0263373 A1 * | 12/2005 | Boevers ............ A01D 41/1217 198/550.2 |
| 2008/0187423 A1 | 8/2008 | Mauchle et al. |
| 2009/0078410 A1 | 3/2009 | Krenek et al. |
| 2009/0129903 A1 | 5/2009 | Lyons |
| 2009/0314791 A1 | 12/2009 | Hartley et al. |
| 2010/0230252 A1 * | 9/2010 | Felton ................ B65G 21/2081 198/841 |
| 2012/0017812 A1 | 1/2012 | Renyer et al. |
| 2013/0240327 A1 * | 9/2013 | Schreiner ............ B65G 41/006 198/550.2 |
| 2014/0023463 A1 | 1/2014 | Oren |
| 2014/0083554 A1 | 3/2014 | Harris |
| 2014/0305769 A1 | 10/2014 | Eiden, III et al. |
| 2015/0003955 A1 | 1/2015 | Oren et al. |
| 2015/0183578 A9 | 7/2015 | Oren et al. |
| 2015/0191318 A1 | 7/2015 | Martel |
| 2015/0284194 A1 | 10/2015 | Oren et al. |
| 2015/0368052 A1 | 12/2015 | Sheesley |
| 2015/0375930 A1 | 12/2015 | Oren et al. |
| 2016/0031658 A1 | 2/2016 | Oren et al. |
| 2016/0039433 A1 | 2/2016 | Oren et al. |
| 2016/0046438 A1 | 2/2016 | Oren et al. |
| 2016/0046454 A1 | 2/2016 | Oren et al. |
| 2016/0068342 A1 | 3/2016 | Oren et al. |
| 2016/0130095 A1 | 5/2016 | Oren et al. |
| 2016/0244279 A1 | 8/2016 | Oren et al. |
| 2016/0264352 A1 | 9/2016 | Oren |
| 2016/0332809 A1 | 11/2016 | Harris |
| 2016/0332811 A1 | 11/2016 | Harris |
| 2017/0129696 A1 | 5/2017 | Oren |
| 2017/0144834 A1 | 5/2017 | Oren et al. |
| 2017/0190523 A1 | 7/2017 | Oren et al. |
| 2017/0203915 A1 | 7/2017 | Oren |
| 2017/0217671 A1 | 8/2017 | Allegretti |
| 2017/0225883 A1 | 8/2017 | Oren |
| 2017/0240350 A1 | 8/2017 | Oren et al. |
| 2017/0240361 A1 | 8/2017 | Glynn et al. |
| 2017/0240363 A1 | 8/2017 | Oren |
| 2017/0267151 A1 | 9/2017 | Oren |

(56) References Cited

U.S. PATENT DOCUMENTS

| | | | |
|---|---|---|---|
| 2017/0283165 A1 | 10/2017 | Oren et al. | |
| 2017/0320660 A1 | 11/2017 | Sanders et al. | |
| 2017/0341865 A1* | 11/2017 | Hanel | B65G 15/08 |
| 2018/0002066 A1 | 1/2018 | Allegretti et al. | |
| 2018/0002120 A1 | 1/2018 | Allegretti et al. | |
| 2019/0016546 A1 | 1/2019 | Friesen | |

FOREIGN PATENT DOCUMENTS

| | | |
|---|---|---|
| GB | 2204847 A | 11/1988 |
| JP | 2008239019 A | 10/2008 |
| WO | 2008012513 A2 | 1/2008 |
| WO | 2013095871 A1 | 6/2013 |
| WO | 2013142421 A1 | 9/2013 |
| WO | 2014018129 A1 | 1/2014 |
| WO | 2014018236 A2 | 1/2014 |
| WO | 2015119799 A1 | 8/2015 |
| WO | 2015191150 A1 | 12/2015 |
| WO | 2015192061 A1 | 12/2015 |
| WO | 2016044012 A1 | 3/2016 |
| WO | 2016160067 A1 | 10/2016 |
| WO | 2016178691 A1 | 11/2016 |
| WO | 2016178692 A1 | 11/2016 |
| WO | 2016178694 A1 | 11/2016 |
| WO | 2016178695 A1 | 11/2016 |
| WO | 2017014768 A1 | 1/2017 |
| WO | 2017014771 A1 | 1/2017 |
| WO | 2017014774 A1 | 1/2017 |
| WO | 2017027034 A1 | 2/2017 |
| WO | 2017095423 A1 | 6/2017 |

* cited by examiner

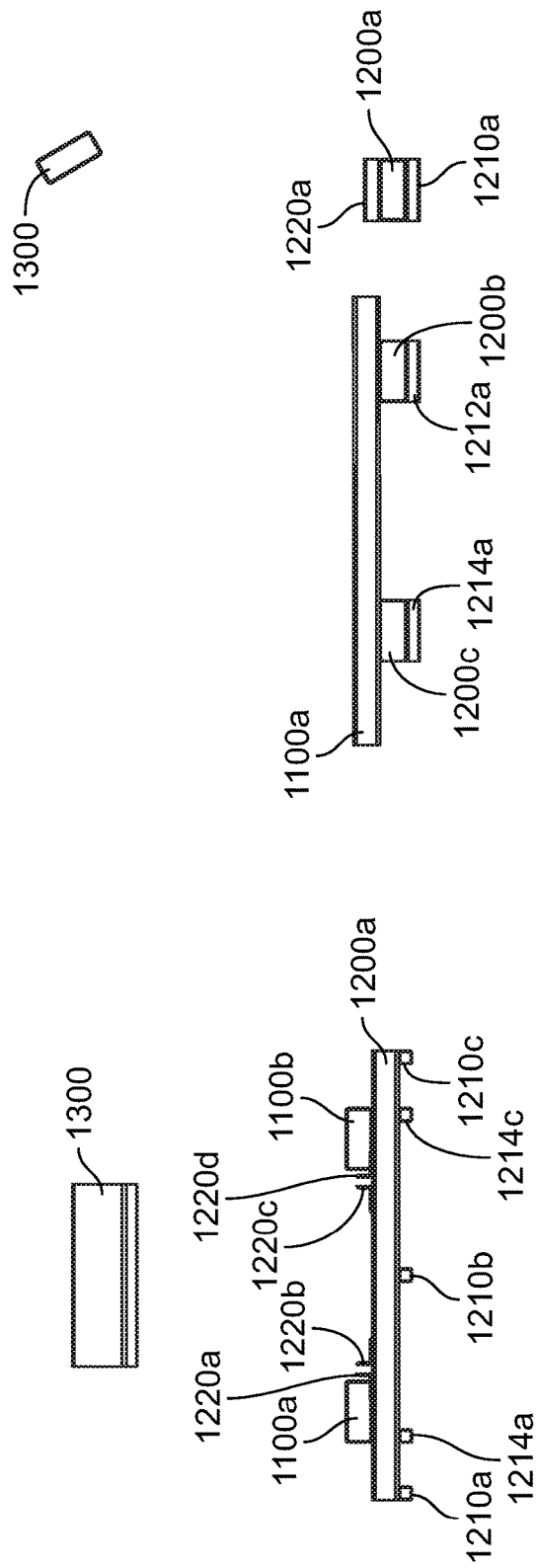
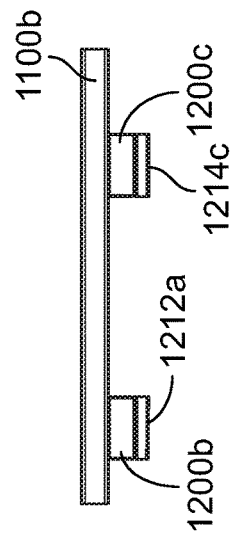
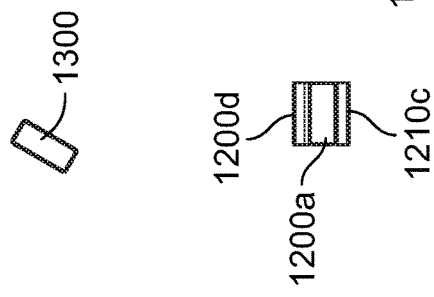
Fig. 9C
Fig. 9D
Fig. 9E

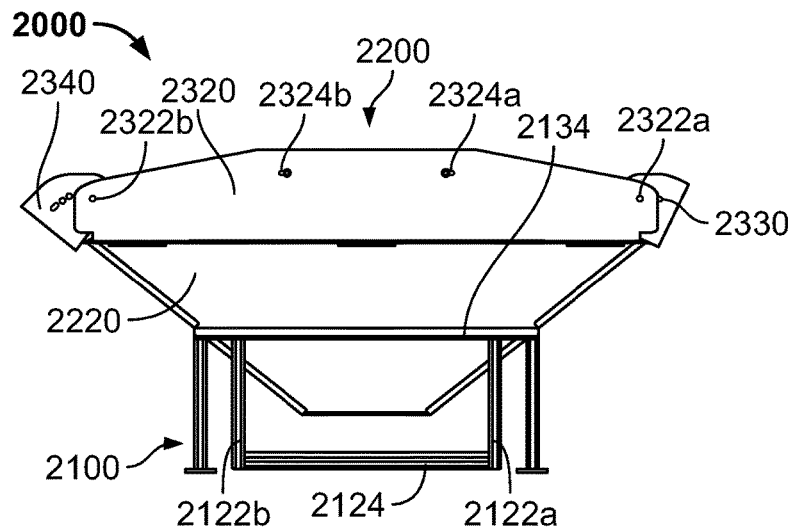
Fig. 10C
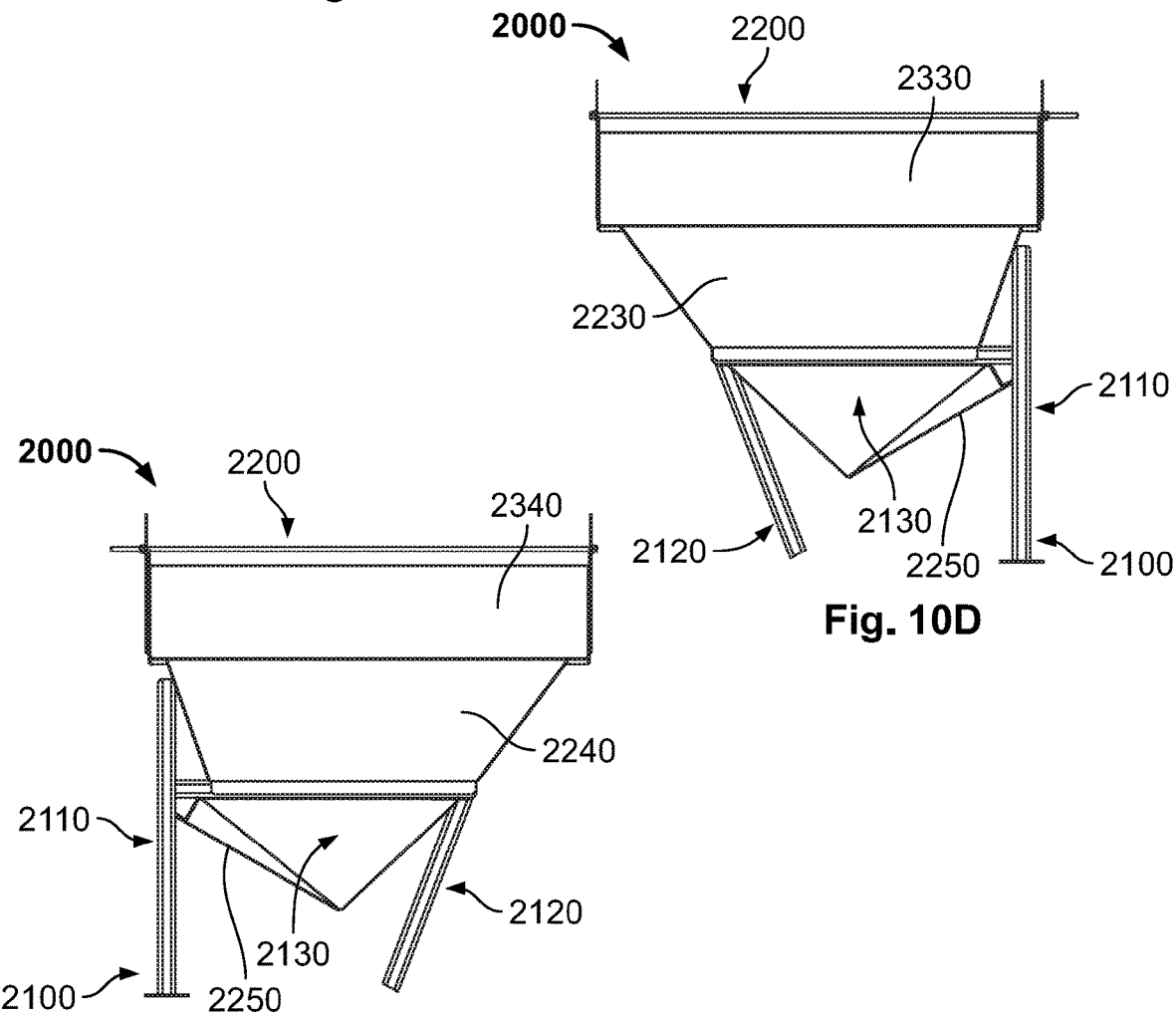
Fig. 10D
Fig. 10E

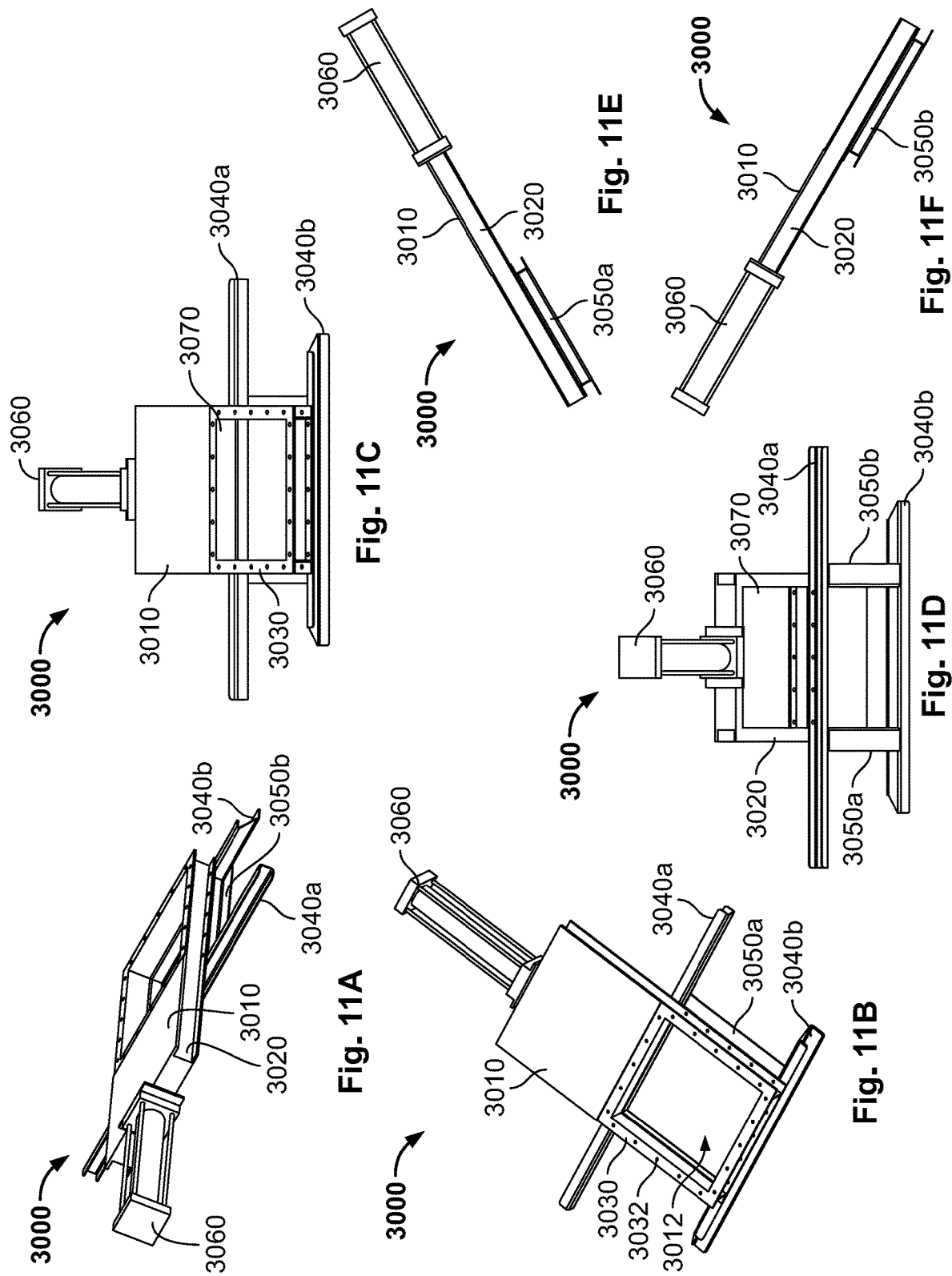

BULK MATERIAL CONVEYOR

BACKGROUND

Various bulk material shipping containers are known. Such known material bulk shipping containers, sometimes referred to herein for brevity as known containers or as known bulk containers, are used to transport a wide range of products, parts, components, items, and materials such as, but not limited to, seeds, shavings, fasteners, and granular materials (such as sand). These are sometimes called loose materials or materials.

New and improved bulk material shipping containers are continuously being developed. For example, U.S. Pat. No. 8,887,914 and U.S. Published Patent Application No. 2018/0002066, which are owned by the assignee of the present application and incorporated herein by reference, disclose relatively new bulk material shipping containers.

As these new bulk material shipping containers are developed, there is a continuing need to develop unloading devices that can be used for unloading and moving loose materials from these new bulk material shipping containers.

New and improved bulk material shipping container unloaders are continuously being developed. For example, U.S. Published Patent Application No. 2018/0002120, which is owned by the assignee of the present application and incorporated herein by reference, discloses relatively new bulk material shipping container unloader apparatus.

There is a continuing need for bulk material conveyors that better move bulk material.

SUMMARY

Various embodiments of the present disclosure provide bulk material conveyors that solve or meet the above needs. The bulk material conveyor of the present disclosure may sometimes be referred herein for brevity as the conveyor.

In various embodiments, the bulk material conveyor includes: (a) a support assembly, (b) a housing connected to the support assembly, (c) a conveyor belt assembly partially positioned in the housing, (d) a motor assembly coupled to the conveyor belt assembly, (e) a hopper assembly including a receiving assembly including a plurality of walls and at least one movable flap extending above at least one of the plurality of walls, (f) a gate assembly including a door movable between an open position and a closed position, and (g) a transition assembly including a plurality of spaced apart conveyor supports, wherein at least one of the spaced apart conveyor supports is rotated about or angled with respect to or relative to a longitudinal axis of the housing.

Additional features and advantages of the present invention are described in, and will be apparent from, the following Detailed Description of Exemplary Embodiments and the Figs.

DESCRIPTION OF THE DRAWINGS

FIG. 9C is a partially exploded front end view of the fork tine receiver assembly of the bulk material conveyor of FIG. 1.

FIG. 9D is a partially exploded first side view of the fork tine receiver assembly of the bulk material conveyor of FIG. 1.

FIG. 9E is a partially exploded second side view of the fork tine receiver assembly of the bulk material conveyor of FIG. 1.

FIG. 10C is a front end view of the hopper assembly of the bulk material conveyor of FIG. 1.

FIG. 10D is a first side view of the hopper assembly of the bulk material conveyor of FIG. 1.

FIG. 10E is a second side view of the hopper assembly of the bulk material conveyor of FIG. 1.

FIG. 11A is a front perspective view of the gate assembly of the bulk material conveyor of FIG. 1.

FIG. 11B is a top rear perspective view of the gate assembly of the bulk material conveyor of FIG. 1.

FIG. 11C is a rear end view of the gate assembly of the bulk material conveyor of FIG. 1.

FIG. 11D is a front end view of the gate assembly of the bulk material conveyor of FIG. 1.

FIG. 11E is a first side view of the gate assembly of the bulk material conveyor of FIG. 1.

FIG. 11F is a second side view of the gate assembly of the bulk material conveyor of FIG. 1.

DETAILED DESCRIPTION OF EXEMPLARY EMBODIMENTS

Figure 1:
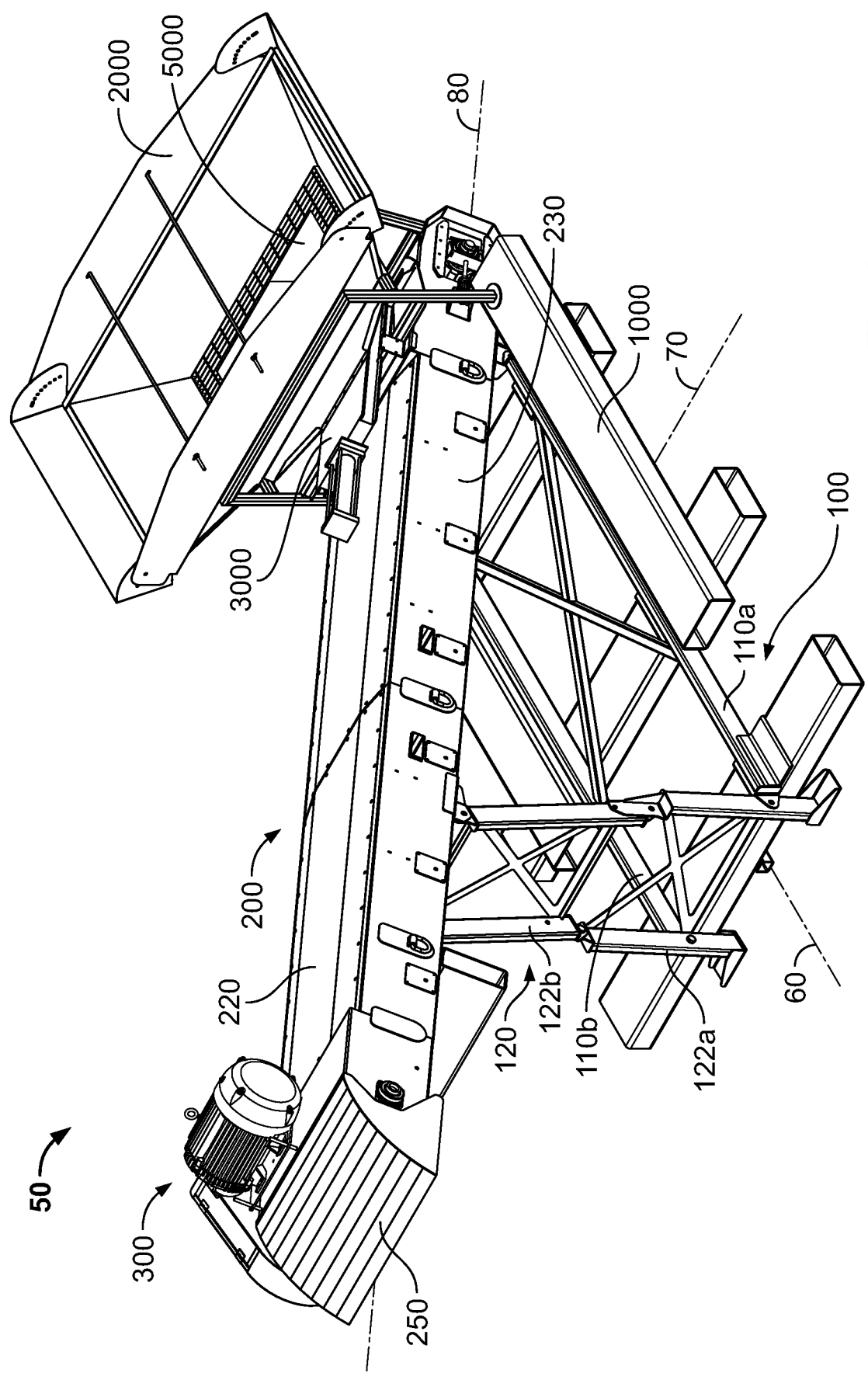
FIG. 1 is a top front perspective view of a bulk material conveyor of an example embodiment of the present disclosure.

While the systems, devices, and methods described herein may be embodied in various forms, the drawings show and the specification describes certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected, and like mounting methods. This specification is intended to be taken as a whole and interpreted in accordance with the principles of the present disclosure and as understood by one of ordinary skill in the art.

Referring specifically now to FIGS. 1 to 8, an example embodiment of a bulk material conveyor of the present disclosure is illustrated and generally indicated by numeral 50.

In various embodiments, the bulk material conveyor 50 can be used in connection with one or more bulk material shipping containers and/or shipping container unloaders. For example, bulk material may be stored in one or more bulk material shipping containers that are supported by one or more shipping container unloaders. An example setup of shipping containers and shipping container unloaders in which the illustrated example bulk material conveyor 50 of the present disclosure may be used is provided in Published U.S. Patent. Application No. 2018/0002120, which is incorporated herein by reference.

The example bulk material conveyor 50 can be moved by a fork lift by inserting the fork lift tines into the tine receivers of the fork tine receiver assembly. The hopper assembly can thereby be positioned underneath a discharge end of the bulk material shipping container(s) and/or shipping container unloader(s) so as to receive the material into the hopper assembly. The bulk material conveyor 50 can then carry or transport the material up from the intake end including the hopper assembly (e.g., the rear end) to the discharge end (e.g., the front end), whereby the material can be discharged into a suitable material receiver.

In the example embodiment shown in FIGS. 1 to 8, the bulk material conveyor 50 includes: (1) a support assembly 100, (2) a housing 200, (3) a motor assembly 300, (4) a fork tine receiver assembly 1000, (5) a hopper assembly 2000, (6) a gate assembly 3000, (7) a transition assembly 4000, and (8) a diverter assembly 5000.

In practice, when these components are used in combination, the bulk material conveyor 50 provides an improved ability to transfer bulk material from one place to another.

The diverter assembly 5000 is positioned inside the hopper assembly 2000, and when material is dropped into the hopper assembly 2000, the diverter assembly 5000 disperses the material around the perimeter of the hopper assembly. The diverter assembly 5000 provides a measure of control to the conveyor 50, controlling the rate and area over which material is dropped into the bottom of the hopper assembly 2000, which reduced stalling. The hopper assembly 2000 provides a connection to the gate assembly 3000, which controls a rate of flow of the material out of the hopper assembly 2000. The position of the gate assembly 3000 (e.g., fully open, fully closed, or in between) enables control of the rate of flow of material onto the conveyor belt assembly of the bulk material conveyor 50. Enabling control of the flow of material (both by the diverter assembly 5000 and by the gate assembly 3000) provides greater control of the distribution of material onto the belt (e.g., both the rate and area of the belt covered). Covering a greater surface area of the belt with the same amount of material reduces the likelihood of stalling. This also reduces the likelihood of a clog or jam caused by too much material getting backed up on the conveyor belt assembly. The transition 4000 also provides a measure of control of the material once it is dropped onto the conveyor belt assembly through the gate assembly 3000. The transition assembly 4000 provides a strong support for the material immediately when it is dropped onto the conveyor belt assembly, and includes angled side members to cause the material to fall toward a centerline of the conveyor. This also reduces the likelihood of clogging and jamming of the conveyor belt assembly.

Regarding the components of the bulk material conveyor 50, the support assembly 100 in particular includes a first longitudinal base member 110*a*, a second longitudinal base member 110*b*, and a scissor linkage assembly 120.

The first longitudinal base member 110*a* and the second longitudinal base member 110*b* each extend along a base of the conveyor 50 between the front end and the rear end. The first longitudinal base member 110*a* and the second longitudinal base member 110*b* extend parallel to a general longitudinal axis 60 of the conveyor 50, and perpendicular to a general transverse axis 70 of the conveyor 50. The first longitudinal base member 110*a* and the second longitudinal base member 110*b* are each pivotally connected to the housing 200 proximate to and below an intake or rear end (not labeled) of the bulk material conveyor 50. The pivotal connection proximate the rear end of the bulk material conveyor 50 enables the housing 200 to rotate with respect to the first longitudinal base member 110*a* and the second longitudinal base member 110*b*. This enables the discharge end (not labeled) of the housing 200 to be elevated with respect to the intake end (not labeled). The first longitudinal base member 110*a* and the second longitudinal base member 110*b* are each pivotally connected to the scissor linkage assembly 120 proximate the discharge or front end of the bulk material conveyor 50. The support assembly 100 also includes stabilizing members connected to the first and second longitudinal members 110*a* and 110*b* (not labeled).

The scissor linkage assembly 120 includes a lower scissor member 122*a* and an upper scissor member 122*b*. The lower scissor member 122*a* and the upper scissor member 122*b* are pivotally connected about a pivot point 124, which enables the lower scissor member 122*a* to rotate with respect to the upper scissor member 122*b* in a "scissor-like" manner. As pivot point 124 moves toward the rear end of the bulk material conveyor 50, the lower scissor member 122*a* and the upper scissor member 122*b* rotate about the pivot point 124, collapsing toward one another. The lower scissor member 122a is connected to the first and second longitudinal base members 110a and 110b, and the upper scissor member 122b is connected to the housing 200. In this orientation, movement of the scissor linkage assembly 120 enables the housing 200 to be raised away from and/or lowered toward the first and second longitudinal members 110a and 110b. The scissor linkage assembly 120 also includes stabilizing members (not labeled).

The housing 200 includes a bottom wall 210, a top wall 220, a first side wall 230, a second side wall 240, a discharge cover 250, and a conveyor belt assembly (not shown). The bottom wall 210, top wall 220, first side wall 230, and second side wall 240 are connected to form an enclosure in which the conveyor belt (not shown) of the conveyor belt assembly moves to carry the material from the lower rear end to the higher front end. The conveyor belt assembly includes the conveyor belt itself, along with one or more rollers or bearings configured to enable the conveyor belt to slide and rotate. A motor assembly (described below) is connected to the conveyor belt assembly to drive it within the housing 200. As shown in FIGS. 1-8, each of the bottom wall 210, top wall 220, first side wall 230, and second side wall 240 can include two or more panels connected end to end. The discharge cover 250 is connected to the top wall 220, first side wall 230, and second side wall 240 at their respective front ends. The discharge cover 250 is curved, and has a downward facing opening to enable material carried up the housing 200 via the conveyor belt assembly to be discharged out of the bulk material conveyor 50, into a truck or other container, for example. As indicated above, the housing 200 is pivotally connected to the first and second longitudinal members 110a and 110b proximate the rear end of the bulk material conveyor 50. This enables the first and second longitudinal members to remain level to the ground, while the housing 200 rotates upward to create an incline. The housing 200 is also pivotally connected to the scissor linkage assembly 120 toward the front end of the conveyor 50. This enables the front end of the housing 200 to be elevated upward with respect to the rear end of the housing 200.

The motor assembly 300 is connected to the housing 200 proximate the front end of the bulk material conveyor 50. The motor assembly 300 is configured to drive the conveyor belt assembly positioned within the housing 200, so as to carry material from the rear end up the inclined housing to the front end. The motor 300 is shown in FIGS. 1 to 8 as having a belt operable within a separate belt housing member, to engage the upper end of the conveyor belt assembly. However, it should be appreciated that the position of the motor assembly, and/or the specific mechanism(s) by which the motor thereof causes the conveyor belt assembly to move can be different than those explicitly illustrated and described, while remaining within the scope of this disclosure.

Fork Tine Receiver Assembly

Specific aspects of the fork tine receiver assembly 1000 are illustrated and described in greater detail in respect to FIGS. 9A, 9B, 9C, 9D, and 9E. However, certain aspects of the fork tine receiver assembly 1000 may be described with reference to other components or features of the bulk material conveyor 50, and, therefore, reference may be made to FIGS. 1 to 8 and the features illustrated therein as well.

The fork tine receiver assembly 1000, and specifically the orientation and position of the various fork tine receivers, enables a forklift driver to access the bulk material conveyor 50 from many different angles. The forklift driver is therefore able to lift and reposition the bulk material conveyor 50 into many different positions and orientations, improving the number of use cases for a given conveyor. In particular, the fork tine receiver assembly 1000 enables both rear and side access, such that the conveyor 50 can be inserted in to narrow openings where other receivers are prevented from use. In a particular use case wherein the bulk material conveyor 50 is used in connection with a bulk material container unloader described in Published U.S. Patent. Application No. 2018/0002120, the narrow spacing of the supports of the unloader require precision placement of the conveyor 50. A forklift may position the conveyor 50 in a roughly close position to the unloader using the rear end fork tine receivers. But final placement of the conveyor 50 may be done only using the side fork tine receivers, due to the spacing of the supports of the unloader. This is one possible example, and it should be appreciated that there are many other situations in which access to the conveyor 50 by a forklift can be done using only the fork tine receivers positioned along the longitudinal axis 60, or using only the fork tine receivers positioned along the transverse axis 70.

The illustrated example fork tine receiver assembly 1000 includes first and second rear end fork tine receivers 1100a and 1100b, first, second, and third side fork tine receivers 1200a, 1200b, 1200c, and a housing fork tine receiver 1300.

Figures 9A, 9B:
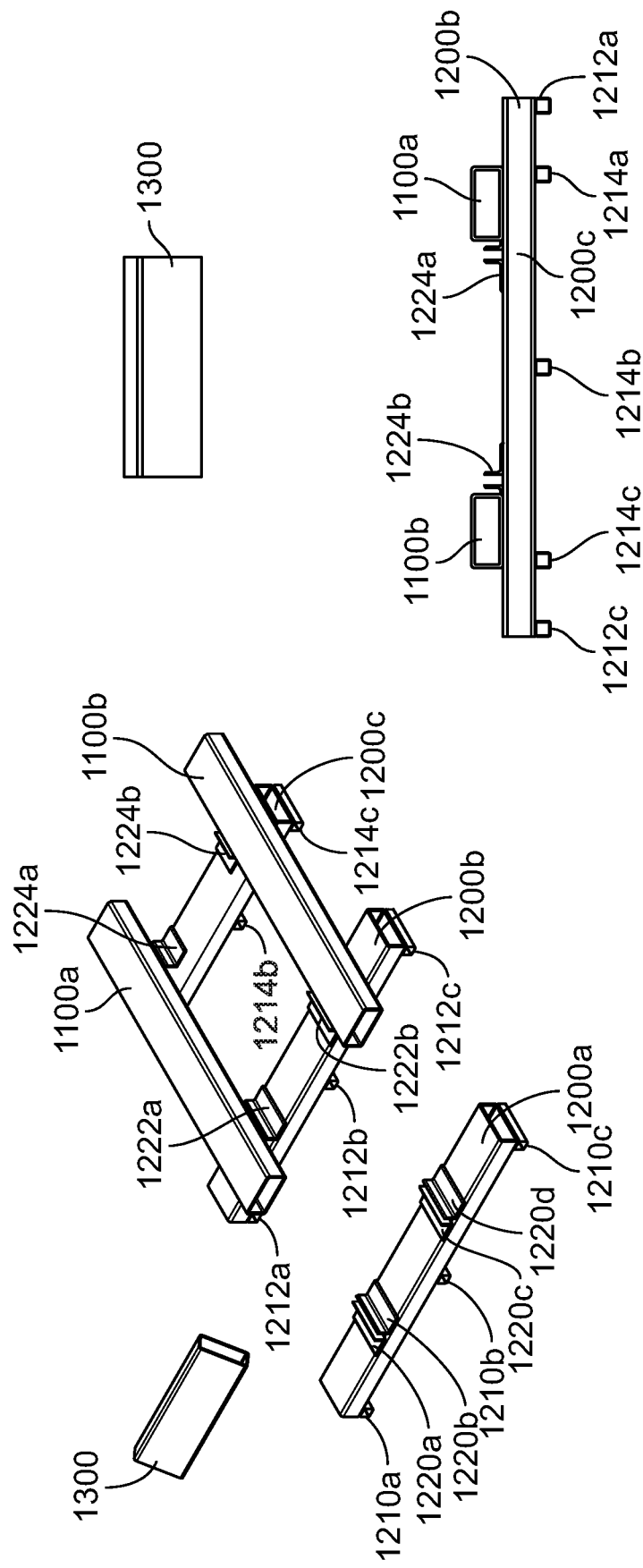
FIG. 9A is a partially exploded top front perspective view of the fork tine receiver assembly of the bulk material conveyor of FIG. 1.
FIG. 9B is a partially exploded rear end view of the fork tine receiver assembly of the bulk material conveyor of FIG. 1.
Figure 10A:
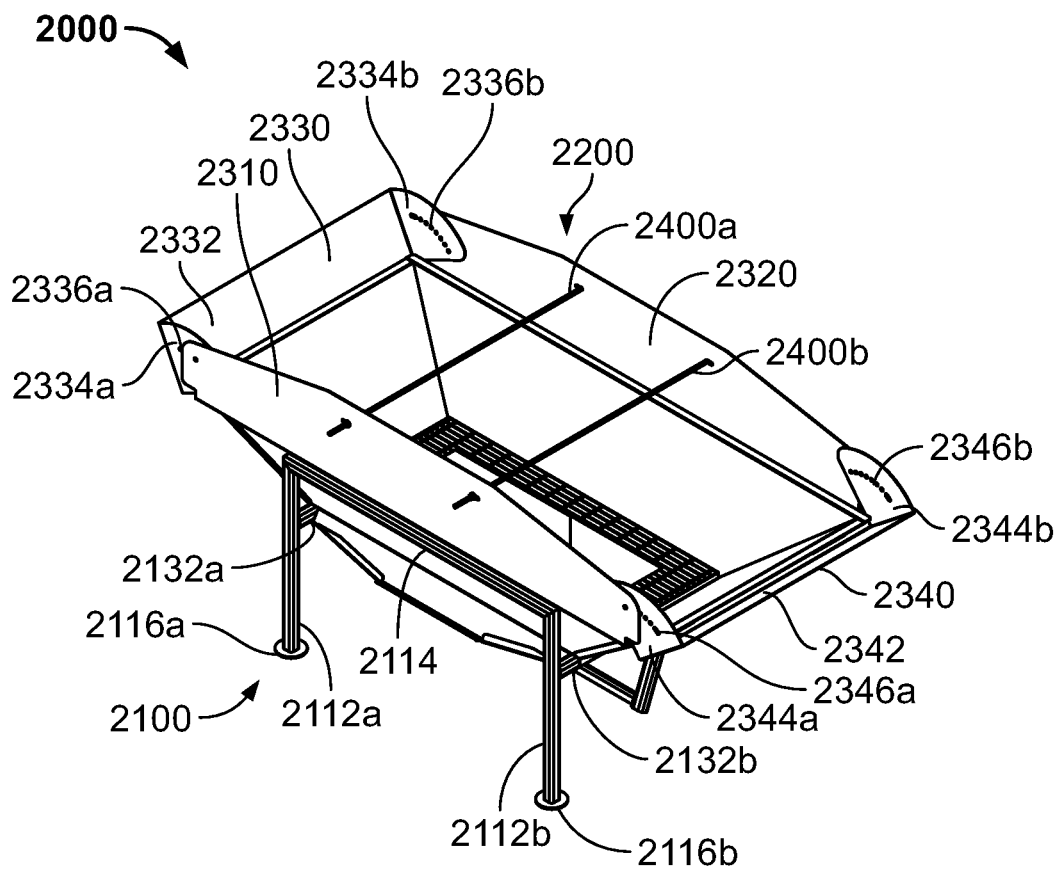
FIG. 10A is a top front perspective view of the hopper assembly of the bulk material conveyor of FIG. 1.
Figure 10B:
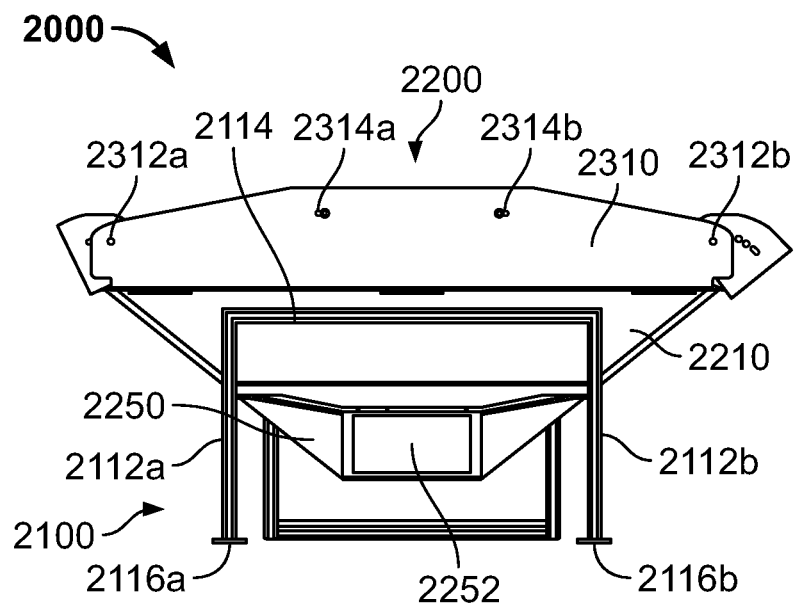
FIG. 10B is a rear end view of the hopper assembly of the bulk material conveyor of FIG. 1.

The first and second rear end fork tine receivers 1100a and 1100b are connected to the second and third side fork tine receivers 1200b and 1200c, forming a rectangular shape. As shown in FIG. 9A, the first and second rear end fork tine receivers 1100a and 1100b are connected to the top side of the second and third side fork tine receivers 1200b and 1200c. This connection may be by welding, may use one or more fasteners, or may be by any other fastening mechanism. The first and second rear end fork tine receivers 1100a and 1100b are spaced apart such that the housing 200 is positionable between them; and in particular, such that the rear end of the housing 200 can be positioned between the inside edges of the first and second rear end fork tine receivers 1100a and 1100b. The first and second rear end fork tine receivers 1100a and 1100b enable a forklift to approach the bulk material conveyor 50 from the rear side, insert the forklift tines, lift the bulk material conveyor 50, and reposition the bulk material conveyor 50. As such, the first and second rear end fork tine receivers are disposed parallel to the longitudinal axis 60 of the bulk material conveyor 50.

The first, second, and third side fork tine receivers 1200a, 1200b, and 1200c are positioned laterally with respect to the bulk material conveyor 50. As such, the first, second, and third side fork tine receivers are disposed parallel to the transverse axis 70 of the bulk material conveyor 50.

As noted above, the second and third side fork tine receivers 1200b and 1200c are connected to the underside of the first and second rear end fork tine receivers 1100a and 1100b. The first, second, and third side fork tine receivers 1200a, 1200b, and 1200c are also connected to respective bottom sides of the longitudinal members 110a and 110b of the support assembly 100. This is illustrated best in FIGS. 1-3. The first, second, and third side fork tine receivers 1200a, 1200b, and 1200c includes three respective sets of feet 1210a-c, 1212a-c, and 1214a-c connected to the underside of the respective side fork tine receivers. The feet of each set 1210a-c, 1212a-c, and 1214a-c are spaced apart from each other. Each foot includes a rectangular tube extending laterally across the respective fork tine receiver to which it is connected. The feet provide stability to the bulk material conveyor, particularly when the conveyor 50 is placed on a surface that has small rocks, sand, and/or other debris.

First, second, and third side fork tine receivers 1200*a*, 1200*b*, and 1200*c* also include stabilizer brackets 1220*a-d*, 1222*a-b*, 1224*a-b*. Each stabilizer bracket 1220*a-d*, 1222*a-b*, and 1224*a-b* is connected to the top side of the respective side fork tine receiver. This is illustrated best in FIG. 9A. The stabilizer brackets 1220*a-d*, 1222*a-b*, and 1224*a-b* may also be connected to the respective longitudinal members 110*a* and 110*b* of the support assembly 100. This is illustrated best in FIGS. 1-3. As shown in FIGS. 9A-E, the first and second side fork tine receivers 1200*a* and 1200*b* are the same length. The third side fork tine receiver 1200*c* is shorter than the first and second side fork tine receivers 1200*a* and 1200*b*. The third side fork tine receiver 1200*c* length is the same as the spacing and width of the two rear end fork tine receivers 1100*a* and 1100*b*, such that the outer sides of the rear end fork tine receivers 1100*a* and 1100*b* align with the end faces of the third side fork tine receiver 1200*c*. The length of the third side fork tine receiver 1200*c* enables the rear end of the bulk material conveyor 50 to be positioned under a bulk material shipping container supported by a bulk material shipping container unloader, such as those described in U.S. Patent Application No. 2018/0002120. If the third side fork tine receiver 1200*c* was the same length as the first and/or second side fork tine receivers 1200*a-b*, it may be more difficult to position the bulk material conveyor 50 without running into a support structure of the bulk material shipping container unloader.

The housing fork tine receiver 1300 is connected laterally to the bottom wall 210 of the housing 200 of the bulk material conveyor 50. As shown best in FIGS. 1-3 and 5-6, the housing fork tine receiver 1300 is connected to the housing 200 proximate the front end of the housing 200. This positioning enables the front end of the housing 200 to be raised or lowered using a fork lift or other mechanical device (i.e., a non-self-powered raising and/or lowering of housing 200). The housing fork tine receiver 1300 length is the same as the width of the bottom wall 210 of the housing 200. As such, the housing fork tine receiver 1300 does not extend beyond the side walls 230 and 240 of the housing 200.

It should be understood that each fork tine receiver can be made from steel or any other suitably strong material. Further, the fork tine receivers, feet, and/or brackets can be connected to each other and to other components described herein using welds, screws, bolts, and/or any other fastener(s) or fastening mechanism(s).

Hopper Assembly

Specific aspects of the hopper assembly 2000 are illustrated in greater detail with respect to FIGS. 10A, 10B, 10C, 10D, and 10E. However, certain aspects of the hopper assembly 2000 may be described with reference to other components or features of the bulk material conveyor 50, and, therefore, reference may be made to FIGS. 1-8 and the features illustrated therein as well.

The hopper assembly 2000 provides a variable sized opening that can be placed underneath a bulk material container and/or bulk material container unloader. This enables the conveyor 50 of the present disclosure to be used in many different settings and with different sized containers, container unloaders, and blender hoppers, without requiring substantial reconfiguration or multiple conveyors. In addition, the hopper assembly 2000, and particularly the use of the flaps, enables the conveyor 50 to be positioned for use with the flaps in a wide or lowered configuration, and then repositioned or rotated to close off a gap between the hopper assembly 2000 and the container. This can help make placement of the conveyor 50 easier, and also assist in preventing material from spilling. The hopper assembly can also assist in screening contaminate materials.

The hopper assembly 2000 includes a support structure 2100 and a receiving assembly 2200.

The support structure 2100 includes an upright support member 2110, an angled support member 2120, and a lateral connection member 2130.

The upright support member 2110 includes a first leg 2112*a* and a second leg 2112*b*, connected at a top end by an arm 2114. The arm 2114 is connected to the first leg 2112*a* and the second leg 2112*b* at substantially right angles. Feet 2116*a* and 2116*b* are connected to the bottom end of the first leg 2112*a* and the second leg 2112*b* respectively. The feet 2116*a* and 2116*b* are configured to rest on the top side of the rear end fork tine receivers 1100*a* and 1100*b*. While the feet 2116*a* and 2116*b* are shown in FIGS. 1, 2, 5, 6, 7 and 8 as resting on the top of the rear end fork tine receivers 1100*a* and 1100*b*, it should be appreciated that the feet may instead be fixed to the rear end fork tine receivers 1100*a* and 1100*b* by welding, fasteners, or other fastening mechanism(s). The arm 2114 is configured to engage the front wall 2210 of the hopper assembly 2000. The upright support member 2110 forms a generally inverted U-shape, and is positioned such that the legs are substantially upright and the arm is substantially horizontal or substantially perpendicular to the legs. The first leg 2112*a* and the second leg 2112*b* are connected to the lateral connection member 2130 at an interior point of each leg (i.e., not at an upper or lower end of each leg).

The angled support member 2120 includes a first leg 2122*a* and a second leg 2122*b*, connected at a bottom end by an arm 2124. The arm 2124 is connected to the first leg 2122*a* and the second leg 2122*b* at substantially right angles. The arm 2124 is shorter than the arm 2114 of the upright support member 2110. The arm 2124 is configured to engage a rear end of the housing 200 of the bulk material conveyor 50. While the arm 2124 is shown in FIGS. 1, 2, 5, and 6, as resting on the housing 200, it should be appreciated that the arm 2124 may instead be fixed to the housing 200 by welding, fasteners, or other fastening mechanism(s). The first leg 2122*a* and the second leg 2122*b* are connected to the lateral connection member 2130 at respective top ends of the legs. The legs 2122*a* and 2122*b* are also angled inward with respect to a vertical or upright position, such that the bottom end of each leg 2122*a* and 2122*b* is closer to the upright support member 2110 than the top end of each leg 2122*a* and 2122*b*. The legs 2122*a* and 2122*b* and their connection to the lateral connection member 2130 form respective acute angles.

The lateral connection member 2130 includes a first side member 2132*a* and a second side member 2132*b*, connected by a rear member 2134. The first side member 2132*a* is substantially horizontal or substantially perpendicular to the legs 2112*a* and 2112*b*, and is connected to the first leg 2112*a* of the upright support member 2110 at a first end, and to the rear member 2134 at a second end. The first side member 2132*a* is connected to the first leg 2112*a* at a position on the first leg 2112*a* approximately two thirds of the way toward the top end. The first side member 2132*a* is configured to engage the first side wall 2230 of the hopper assembly 2000. While the first side wall 2230 of the hopper assembly 2000 is shown in the figures as resting on the first side member 2132*a*, it should be appreciated that the first side member 2132*a* may instead be fixed to the first side wall 2230 by welding, fasteners, or other fastening mechanism(s).

The second side member 2132*b* is substantially horizontal or substantially perpendicular to the legs 2112*a* and 2112*b*, and is connected to the second leg 2112*b* of the upright support member 2110 at a first end, and to the rear member 2134 at a second end. The second side member 2132*b* is connected to the second leg 2112*b* at a position on the second leg 2112*b* approximately two thirds of the way toward the top end. The second side member 2132*b* is configured to engage the second side wall 2240 of the hopper assembly 2000. While the second side wall 2240 of the hopper assembly 2000 is shown in the figures as resting on the second side member 2132*b*, it should be appreciated that the second side member 2132*b* may instead be fixed to the second side wall 2240 by welding, fasteners, or other fastening mechanism(s).

The rear member 2134 is substantially horizontal or substantially perpendicular to the legs 2112*a* and 2112*b*, and is connected to the first side member 2132*a* and the second side member 2132*b* at substantially right angles. The rear member 2134 is the same length as the arm 2114 of the upright support member 2110. The rear member 2134 is configured to engage the rear wall 2220 of the hopper assembly 2000. While the rear wall 2220 of the hopper assembly 2000 is shown in the figures as resting on the rear member 2134, it should be appreciated that the rear member 2134 may instead be fixed to the rear wall 2220 by welding, fasteners, or other fastening mechanism(s).

The receiving assembly 2200 includes a front wall 2210, a rear wall 2220, a first side wall 2230, a second side wall 2240, a base plate 2250, a front flap 2310, a rear flap 2320, a first side flap 2330, a second side flap 2340, and stabilizer rods 2400*a* and 2400*b*.

The front wall 2210 is connected to the first side wall 2230, the second side wall 2240, and the base plate 2250. The front wall 2210 is angled inward such that a top edge is further from a center of the hopper assembly 2000 than a bottom edge. This assists the receiving assembly 2200 in directing material toward a center of the receiving assembly 2200 when viewed from above. The sides of the front wall 2210 are tapered inward as well, matching the inward angle of the first side wall 2230 and the second side wall 2240. The front wall 2210 is configured to engage the arm 2114 of the upright support member 2110 of the support assembly 2100. A top edge of the front wall 2210 is connected to front flap 2310.

The rear wall 2220 is connected to the first side wall 2230, the second side wall 2240, and the base plate 2250. The rear wall 2210 is angled inward such that a top edge is further from a center of the hopper assembly 2000 than a bottom edge. This assists the receiving assembly 2200 in directing material toward a center of the receiving assembly 2200 when viewed from above. The sides of the rear wall 2220 are tapered inward as well, matching the inward angle of the first side wall 2230 and the second side wall 2240. The rear wall 2220 is configured to engage the arm 2134 of the angled support member 2110 of the support assembly 2100. A top edge of the rear wall 2220 is connected to rear flap 2320.

The first side wall 2230 is connected to the front wall the rear wall 2220, and the base plate 2250. The first side wall 2230 is angled inward such that the top edge is further from a center of the hopper assembly 2000 than a bottom edge. This assists the receiving assembly 2200 in directing material toward a center of the receiving assembly 2200 when viewed from above. This sides of the first side wall 2230 are tapered inward as well, matching the inward angle of the front wall 2210 and the rear wall 2220. The first side wall 2230 is configured to engage the first side member 2132*a* of the lateral connection member 2130 of the support assembly 2100. A top edge of the first side wall 2230 is rotatably connected to the first side flap 2330.

The second side wall 2240 is connected to the front wall 2210, the rear wall 2220, and the base plate 2250. The second side wall 2240 is angled inward such that the top edge is further from a center of the hopper assembly 2000 than a bottom edge. This assists the receiving assembly 2200 in directing material toward a center of the receiving assembly 2200 when viewed from above. This sides of the second side wall 2240 are tapered inward as well, matching the inward angle of the front wall 2210 and the rear wall 2220. The second side wall 2240 is configured to engage the second side member 2132*b* of the lateral connection member 2130 of the support assembly 2100. A top edge of the second side wall 2240 is rotatably connected to the second side flap 2340.

The base plate 2250 is connected to bottom edges of the front wall 2210, the rear wall 2220, the first side wall 2230, and the second side wall 2240. The base plate 2250 defines a rectangular opening 2252 through which material can flow onto a conveyor belt assembly of the bulk material conveyor 50. The base plate 2250 is angled with respect to horizontal, such that a front edge of the base plate 2250 is higher than a rear edge. This is illustrated best in FIGS. 10D and 10E).

The front flap 2310 is connected to and extends upwardly from the front wall 2210 in a substantially vertical or upright direction. The front flap 2310 extends across a full transverse length of the front wall 2210. The front 2310 defines first and second expansion apertures 2312*a* and 2312*b*. Suitable pins, fasteners, or other members can be inserted into the expansion apertures 2312*a* and 2312*b* and through corresponding apertures of the first and second side flaps 2330 and 2340. The front flap 2310 also defines first and second stabilizing apertures 2314*a* and 2314*b*. Stabilizer rods 2400*a* and 2400*b* can be inserted through the stabilizing apertures 2314*a* and 2314*b* to connect the front flap 2310 to the rear flap 2320. The stabilizing rods 2400*a* and 2400*b* help provide stability and maintain the front and rear flaps in substantially vertical or upright positions even under stress.

The rear flap 2320 is connected to and extends upwardly from the rear wall 2220 in a substantially vertical or upright direction. The rear flap 2320 extends across a full transverse length of the rear wall 2220. The rear flap 2320 defines first and second expansion apertures 2322*a* and 2322*b*. Suitable pins, fasteners, or other members can be inserted into the expansion apertures 2322*a* and 2322*b* and through corresponding apertures of the first and second side flaps 2330 and 2340. The rear flap 2320 also defines first and second stabilizing apertures 2324*a* and 2324*b*. Stabilizer rods 2400*a* and 2400*b* can be inserted through the stabilizing apertures 2324*a* and 2324*b* to connect the front flap 2310 to the rear flap 2320. The stabilizing rods 2400*a* and 2400*b* help provide stability and maintain the front and rear flaps in substantially vertical or upright positions even under stress.

The shape of front and rear flaps are the same in this illustrated example embodiment; although they can vary in accordance with present disclosure.

The first side flap 2330 includes a flat end plate 2332, a first rotational connector plate 2334*a*, and a second rotational connector plate 2334*b*. The flat end plate 2332 is connected to the first rotational connector plate 2334*a* and the second rotational connector plate 2334*b* at substantially 90 degree angles. The flat end plate 2332 is rotatably connected to the top edge of the first side wall 2230, along the length of the first side wall 2230. The first and second rotational connector plates 2334a and 2334b are quarter-circular in shape, having two flat edges connected at a substantially 90 degree angle on respective first sides, and a quarter-circular arc joining the flat edges on the respective second sides. The first and second rotational connector plates 2334a and 2334b are connected to the flat end plate 2332 along respective first flat edges at substantially 90 degree angles. Each rotational connector plate 2334a and 2334b defines a plurality of spaced apart expansion apertures 2336a and 2336b that align with the expansion apertures 2312a and 2322a of the front flap 2310 and rear flap 2320 respectively. The plurality of spaced apart expansion apertures 2336a and 2336b are arranged in an arc, such that each aperture aligns one at a time with the expansion apertures 3212a and 2322a of the front flap 2310 and rear flap 2320 respectively as the first side flap 2330 is rotated inward or outward from a center of the hopper assembly 2000. Pins or other suitable fasteners (not shown) can be inserted into the expansion apertures to fix the first side flap 2330 in place with respect to the front flap 2310 and the rear flap 2320. This enables the receiving assembly 2200 to have a variable sized top opening.

The second side flap 2340 includes a flat end plate 2342, a first rotational connector plate 2344a, and a second rotational connector plate 2344b. The flat end plate 2342 is connected to the first rotational connector plate 2344a and the second rotational connector plate 2344b at substantially 90 degree angles. The flat end plate 2342 is rotatably connected to the top edge of the second side wall 2240, along the length of the second side wall 2240. The first and second rotational connector plates 2344a and 2344b are quarter-circular in shape, having two flat edges connected at a substantially 90 degree angle on respective first sides, and a quarter-circular arc joining the flat edges on the respective second sides. The first and second rotational connector plates 2344a and 2344b are connected to the flat end plate 2342 along respective first flat edges at substantially 90 degree angles. Each rotational connector plate 2344a and 2344b defines a plurality of spaced apart expansion apertures 2346a and 2346b that align with the expansion apertures 2312b and 2322b of the front flap 2310 and rear flap 2320 respectively. The plurality of spaced apart expansion apertures 2346a and 2346b are arranged in an arc, such that each aperture aligns one at a time with the expansion apertures 3212b and 2322b of the front flap 2310 and rear flap 2320 respectively as the second side flap 2340 is rotated inward or outward from a center of the hopper assembly 2000. Pins or other suitable fasteners (not shown) can be inserted into the expansion apertures to fix the second side flap 2340 in place with respect to the front flap 2310 and the rear flap 2320. This enables the receiving assembly 2200 to have a variable sized top opening.

Stabilizer rods 2400a and 2400b extend across the top opening of the receiving assembly 2200. Stabilizer rods 2400a and 2400b connect the front flap 2310 and the rear flap 2320, to provide stability such that the front flap 2310 and the rear flap 2320 remain substantially vertical or upright, even under stress from material being dropped into the receiving assembly 2200.

Gate Assembly

Specific aspects of the gate assembly 3000 are illustrated in greater detail with respect to FIGS. 11A, 11B, 11C, 11D, 11E, and 11F. However, certain aspects of the gate assembly 3000 may be described with reference to other components or features of the bulk material conveyor 50, and, therefore, reference may be made to FIGS. 1-8 and the features illustrated therein as well.

The gate assembly 3000 enables the material flow to be controlled.

The illustrated example gate assembly 3000 includes a front panel 3010, a rectangular frame 3020, a collar 3030, first and second transverse attachment bars 3040a and 3040b, first and second longitudinal support bars 3050a and 3050b, an actuator 3060, and a door 3070.

The front panel 3010 includes a rectangular panel, connected to a top portion of the rectangular frame 3020. A bottom portion of the rectangular frame 3020 defines an opening 3012, through which material can flow from the hopper assembly 2000 onto the conveyor belt of the conveyor belt assembly of the bulk material conveyor 50. FIGS. 11A-F shows that the front panel 3010 and the opening 3012 each comprise half of the rectangular frame 3020. It should be understood that the opening 3012 may be a smaller or larger proportion of the area defined by the rectangular frame 3020, and that the front panel 3010 may cover a smaller or larger proportion of the area defined by the rectangular frame 3020.

The collar 3030 is positioned on the rectangular frame 3020, and particularly around an outer perimeter of the opening 3012 defined by the rectangular frame 3020. The collar 3030 defines a plurality of spaced apart apertures 3032. Apertures 3032 may align with corresponding apertures on the hopper assembly 2000. Specifically, the apertures 3032 may align with apertures of the base plate 2250 of the receiving assembly 2200, such that the opening 2252 defined by the base plate 2250 aligns with the opening 3012 defined by the rectangular frame 3020. Fasteners may be inserted into the apertures 3032 to connect the gate assembly 3000 to the hopper assembly 2000. The collar may be connected to the hopper assembly such that when the door 3070 of the gate assembly 3000 is closed, material cannot escape.

The first and second transverse attachment bars 3040a and 3040b are connected to the underside of the rectangular frame 3020. The first transverse attachment bar 3040a is connected to the rectangular frame 3020 at midpoint of the frame, specifically along a line extending laterally across the rectangular frame 3020 separating the opening 3012 from the front panel 3010. The first transverse attachment bar 3040a extends across the rectangular frame 3020, and has both the first end and the second end extending beyond the sides of the rectangular frame 3020. The first end of the first transverse attachment bar 3040a connects to the first leg 2112a of the upright support member 2100 of the hopper assembly 2000. The second end of the first transverse attachment bar 3040a connects to the second leg 2112b of the upright support member 2100 of the hopper assembly 2000. As shown in FIG. 1 in particular, the first and second ends of the first transverse attachment bar 3040a connect to the first and second legs 2112a and 2112b of the upright support member 2100 at approximately a midpoint of the legs.

Figure 2:
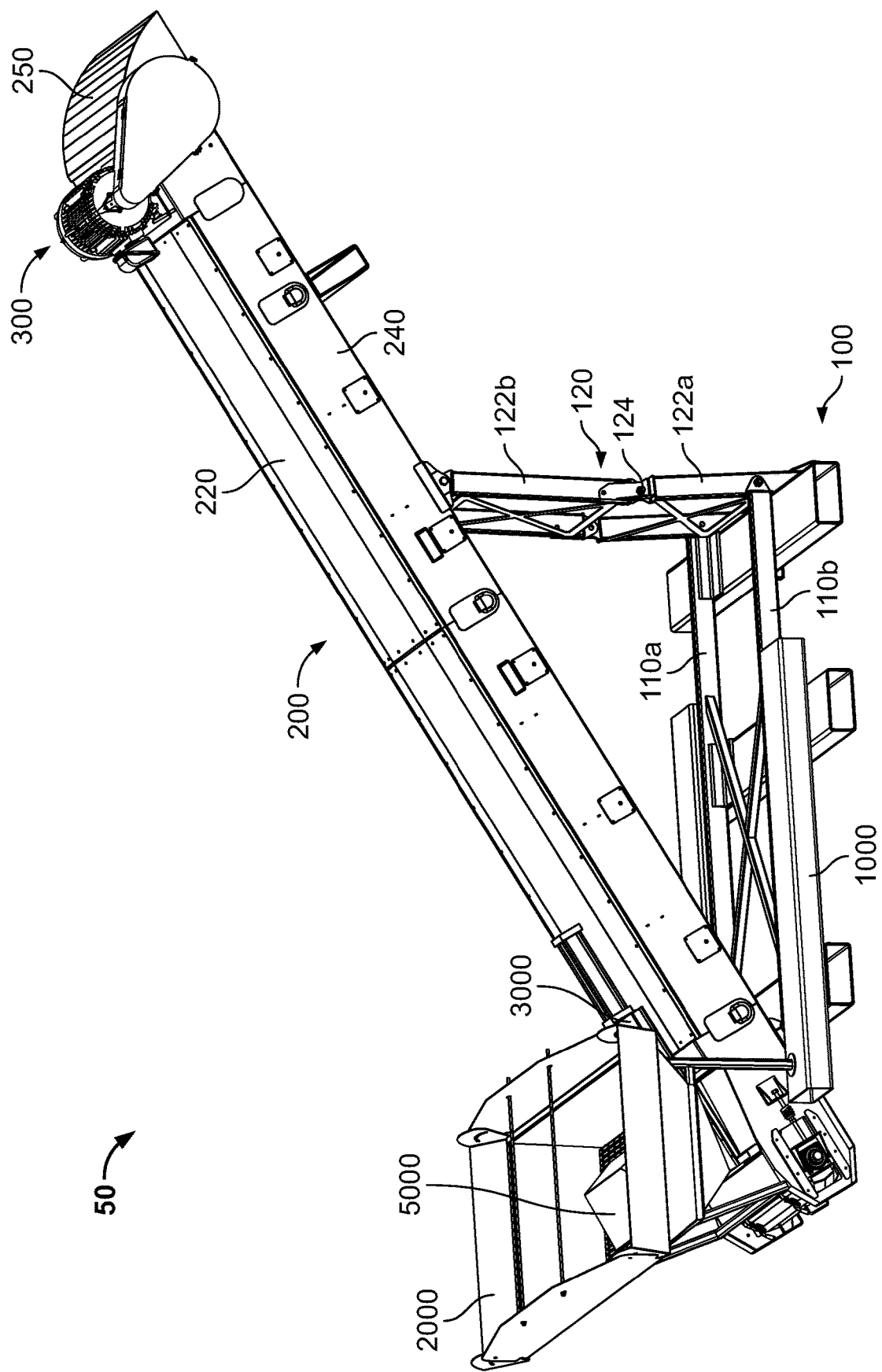
FIG. 2 is a top second side perspective view of the bulk material conveyor of FIG. 1.
Figure 3:
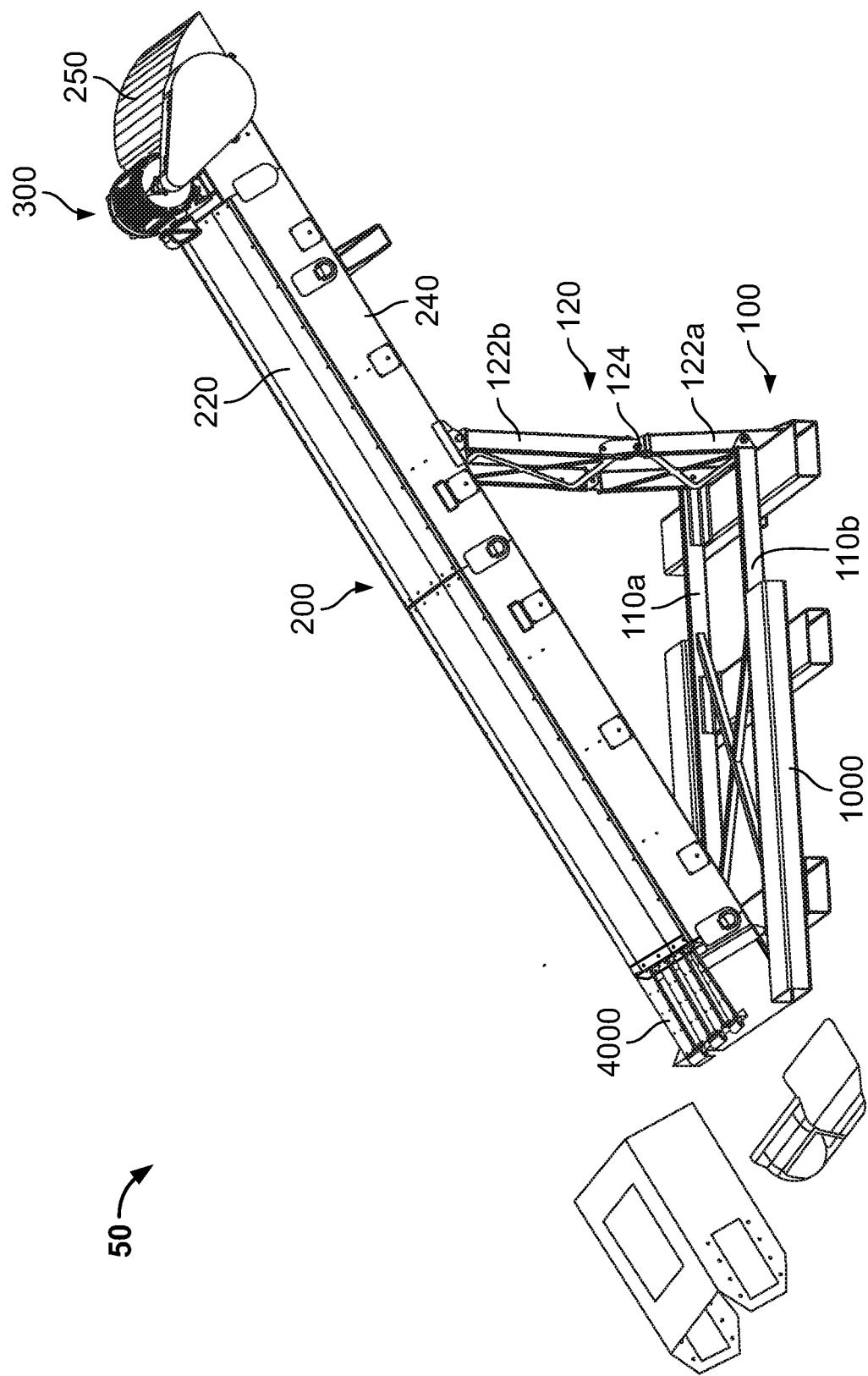
FIG. 3 is a partially exploded top rear perspective view of the bulk material conveyor of FIG. 1, wherein the hopper, diverter, and gate have been removed.
Figure 4:
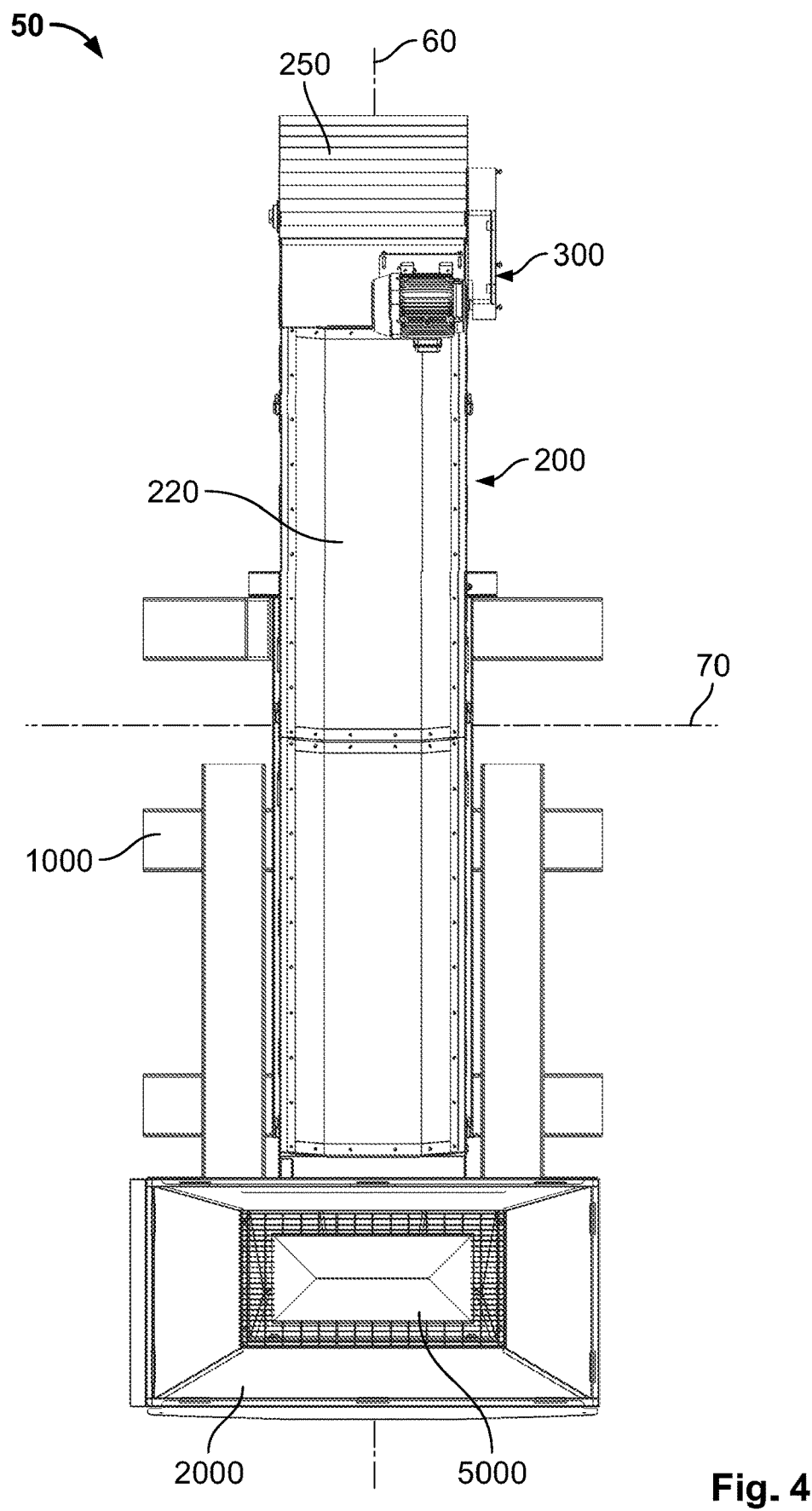
FIG. 4 is a top view of the bulk material conveyor of FIG. 1.
Figure 5:
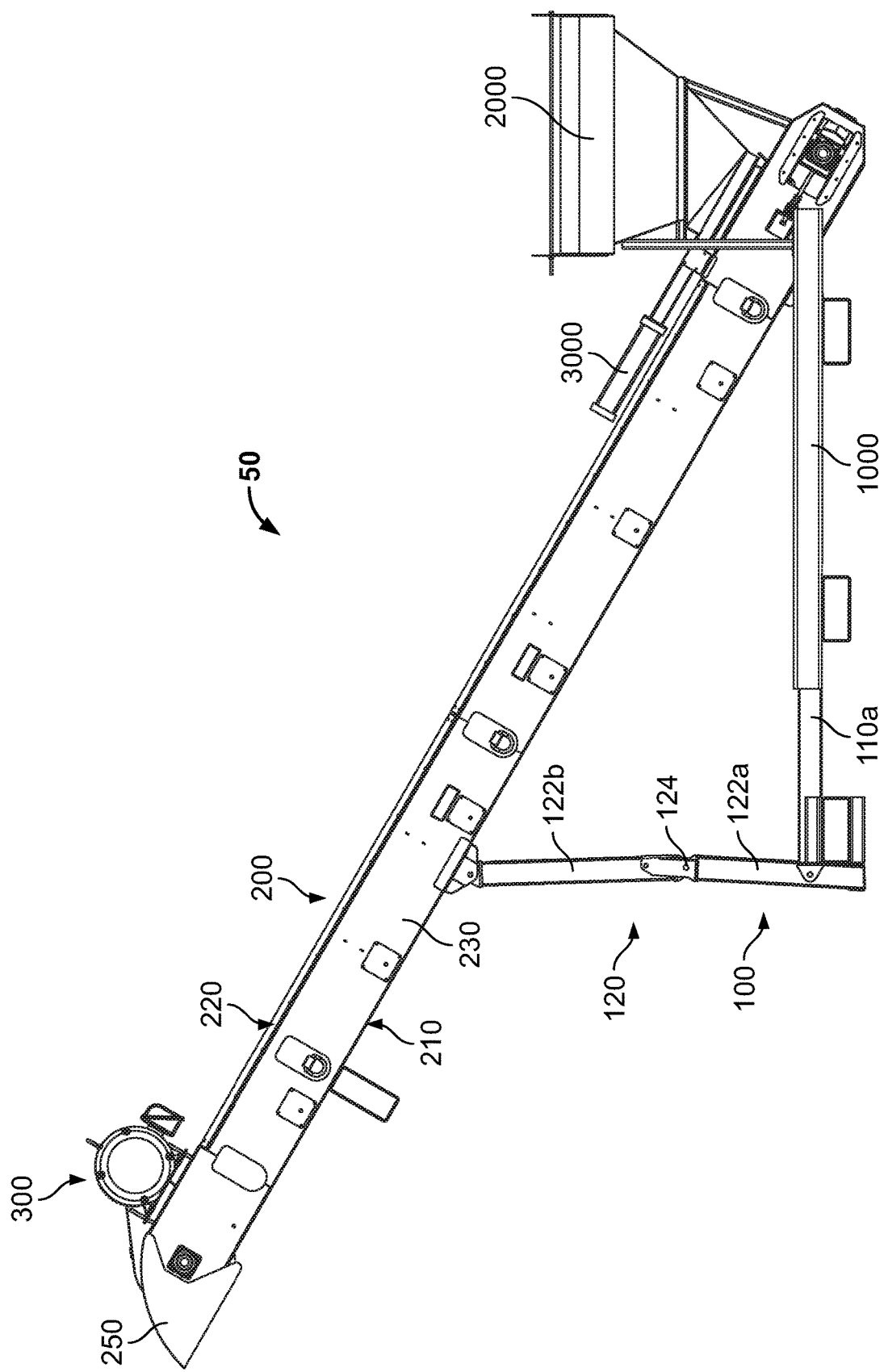
FIG. 5 is a first side view of the bulk material conveyor of FIG. 1.
Figure 6:
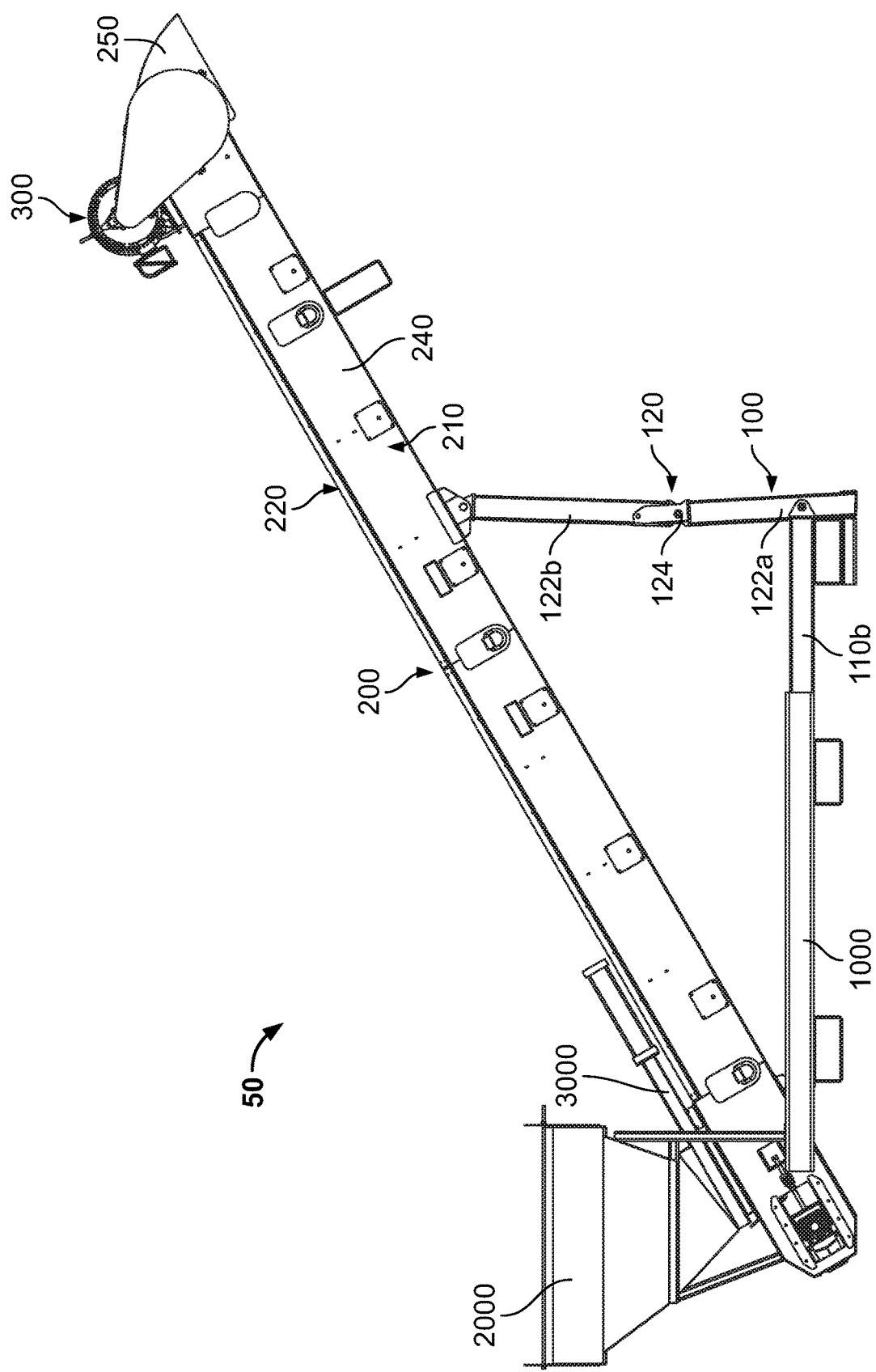
FIG. 6 is a second side view of the bulk material conveyor of FIG. 1.
Figure 7:
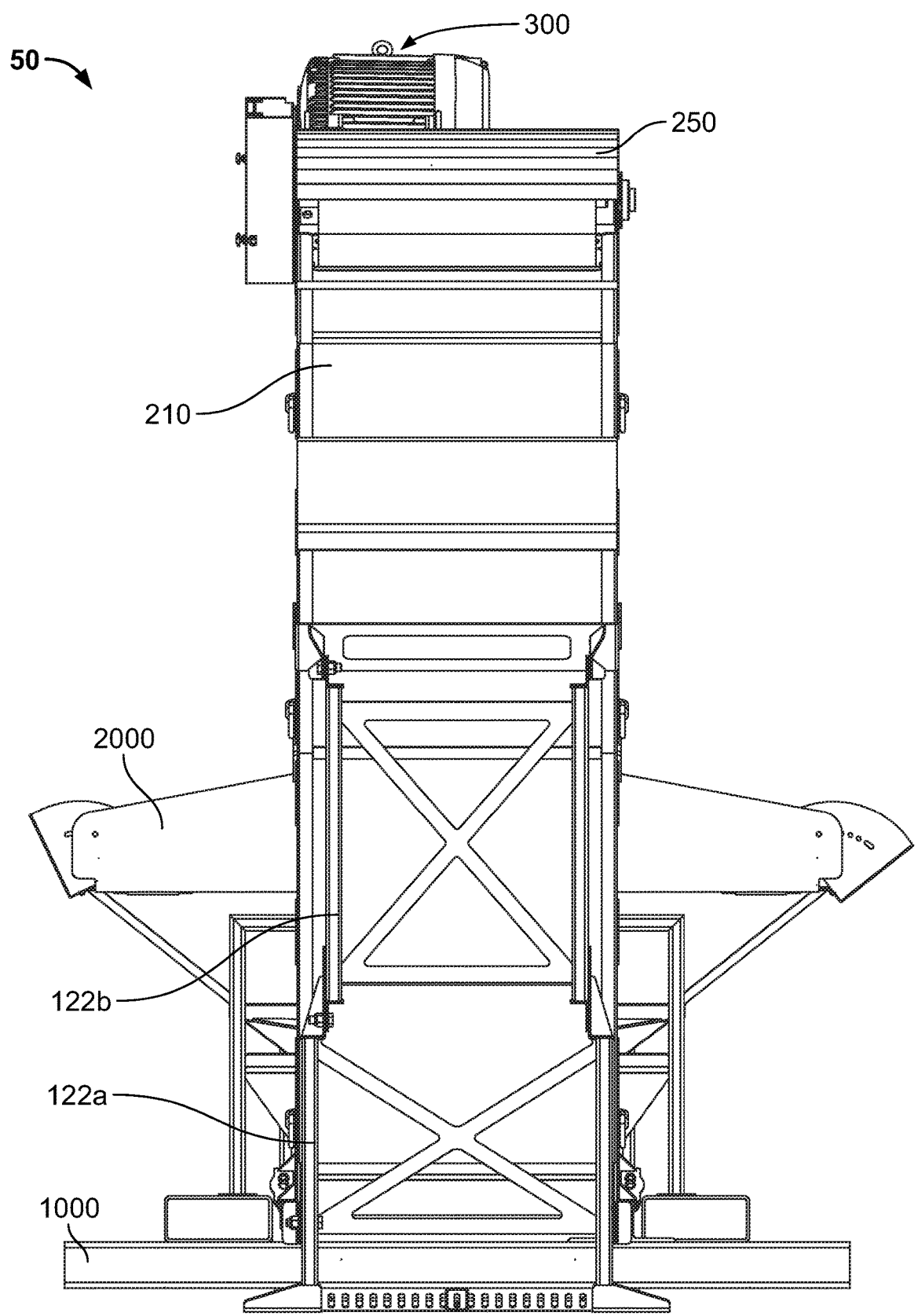
FIG. 7 is a front end view of the bulk material conveyor of FIG. 1.
Figure 8:
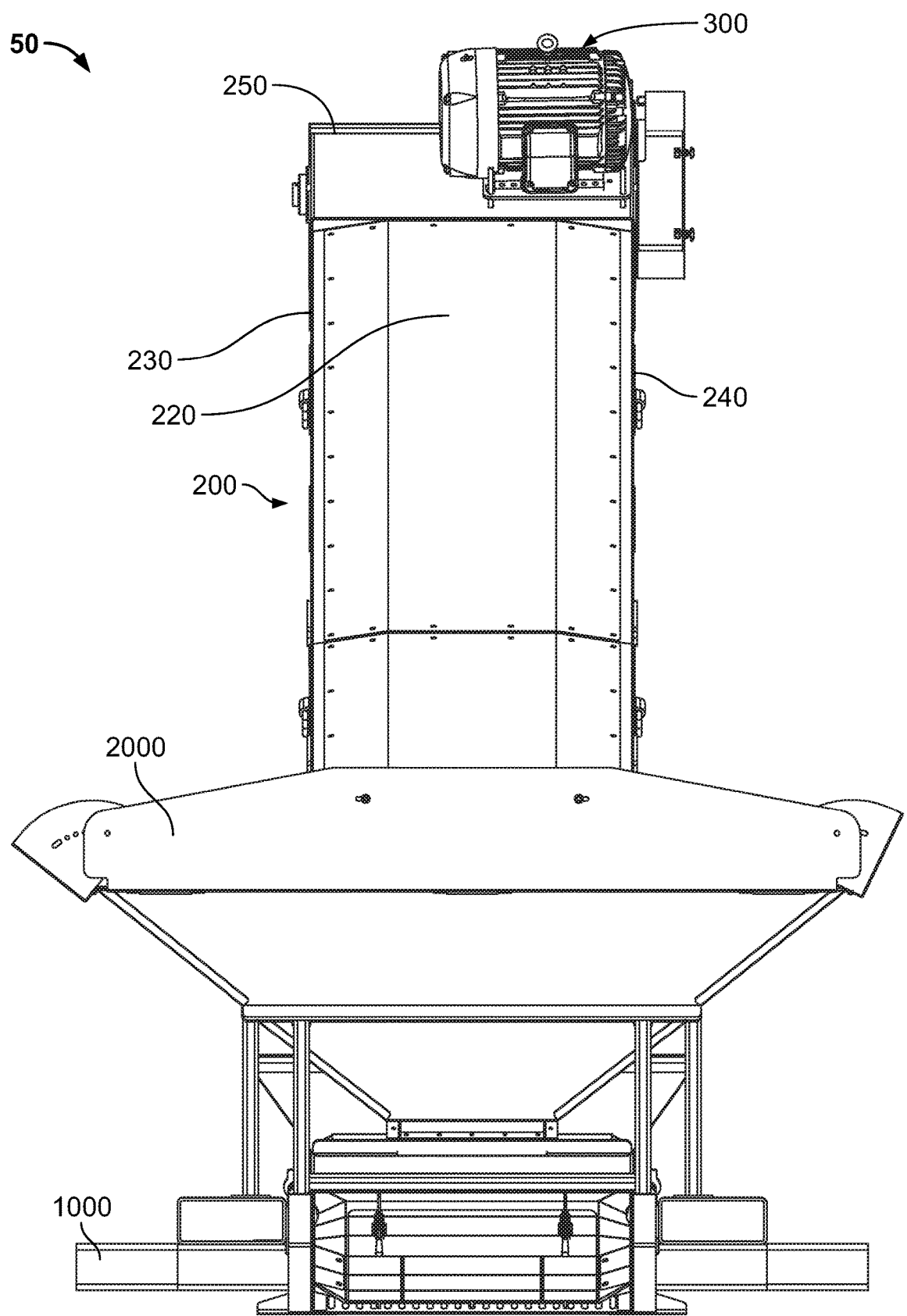
FIG. 8 is a rear end view of the bulk material conveyor of FIG. 1.

The second transverse attachment bar 3040b is connected to a bottom end of the rectangular frame 3020, specifically along a line extending laterally across the bottom end of the frame 3020. The second transverse attachment bar 3040b extends across the rectangular frame 3020, and has both the first end and the second end extending beyond the sides of the rectangular frame 3020. As shown in FIGS. 1 and 2, the second transverse attachment bar 3040b engages the housing 200, providing support for the gate assembly 3000.

The first and second longitudinal support bars 3050a and 3050b extend between the first transverse support bar 3040a and the second transverse support bar 3040b respectively. The longitudinal support bars 3050a and 3050b extend along the underside of the rectangular support 3020, specifically along the portion of the rectangular support that defines the opening 3012. The first and second longitudinal supports provide additional support to the rectangular frame 3020 and collar 3030.

The actuator 3060 is connected to the rectangular frame 3020, the front panel 3010, and the door 3070. The actuator moves the door 3070 between an open position that enables material to pass through the opening 3012, and a closed position that prevents material from passing through the opening 3012. FIGS. 11A-F illustrate the door 3070 in the open position. The door 3070 is slidably disposed within the rectangular frame 3020, such that the door 3070 can slide under the front panel 3010 when in the open position, and can block the opening 3012 when in the closed position. The actuator is illustrated in the figures as being a pneumatically controlled device; however, it should be appreciated that other motors, actuators, or devices configured to move the door 3070 between an open and a closed position may be employed in accordance with the present disclosure.

The gate assembly 3000 is positioned between the hopper assembly 2000 and the housing 200 of the bulk material conveyor 50. This enables the gate assembly 3000, via the door 3070, to either enable or prevent material from exiting the hopper assembly 2000 and being dropped onto the conveyor belt of the conveyor belt assembly of the bulk material conveyor 50.

Transition Assembly

Specific aspects of the transition assembly 4000 are illustrated in greater detail with respect to FIGS. 12A-H. However, certain aspects of the transition assembly 4000 may be described with reference to other components or features of the bulk material conveyor 50, and, therefore, reference may be made to FIGS. 1-8 and the features illustrated therein as well.

The transition assembly 4000 enables a reduction in friction of the conveyor belt assembly of the bulk material conveyor 50, which in turn reduces wear and tear and extends the life of the conveyor belt assembly. The transition assembly spreads the material more evenly across the conveyor belt of the conveyor belt assembly in a lateral direction, with a bias towards a center of the conveyor belt assembly. This aids in preventing material from becoming overloaded on one side of the conveyor belt assembly, and can help prevent material from falling off the sides of the conveyor belt assembly.

The illustrated example transition assembly 4000 includes a first lateral end support 4100, a second lateral end support 4200, first, second, third, and fourth conveyor supports 4300a, 4300b, 4300c, and 4300d, and first, second, and third rollers 4400a, 4400b, and 4400c.

The first lateral end support 4100 includes a first plate 4110 and a second plate 4120, connected to form an L-shaped bracket. The first plate 4110 has a generally flat bottom edge, and is connected to the second plate 4120 along the flat bottom edge. The first plate 4110 includes a curved upper edge. The curved upper edge includes a generally flat middle portion, and angled outer portions that mirror each other. The curved upper edge forms a generally U or V shaped edge with a flat middle portion. This is illustrated best in FIGS. 12A, 12B, 12C, and 12D. An inside face of the first lateral end support 4100 is connected to the first, second, third, and fourth conveyor supports 4300a-d. The first and fourth conveyor supports 4300a and 4300d are connected to the inside face of the first lateral end support 4100 at an angle matching the angle of the curved on the upper edge of the first plate 4110. The second and third conveyor supports 4300b and 4300c are connected to the inside face of the first lateral end support 4100 at an angle matching the angle of the generally flat middle portion of the upper edge of the first plate 4110. An outer face of the first lateral end support is configured for connection to the housing 200 of the bulk material conveyor. This is illustrated best in FIG. 12G. The first plate 4110 defines a plurality of apertures, through which one or more fasteners may be passed to connect the transition assembly 4000 to the housing 200.

The second lateral end support 4200 includes a first plate 4210 and a second plate 4220, connected to form an L-shaped bracket. The first plate 4210 has a generally flat bottom edge, and is connected to the second plate 4220 along the flat bottom edge. The first plate 4210 also has a generally flat upper edge. An inside face of the second lateral end support 4200 is connected to the first, second, third, and fourth conveyor supports 4300a-d. The first, second, third, and fourth conveyor supports 4300a-d are connected to the inside face of the second lateral end support 4200 at an angle matching the angle of the upper edge of the first plate 4210. Rollers 4400a-c are coupled to an outer face of the second lateral end support 4200.

Figure 12A:
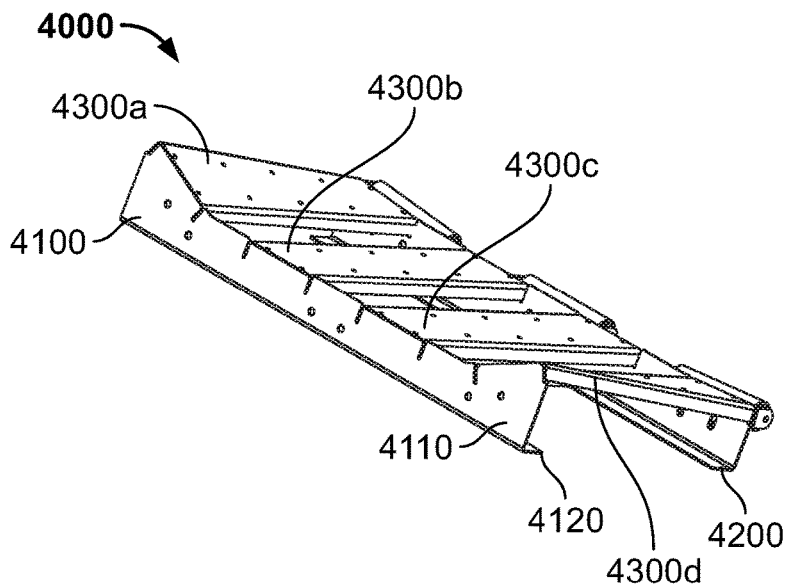
FIG. 12A is a top front perspective view of the transition assembly of the bulk material conveyor of FIG. 1.
Figure 12B:
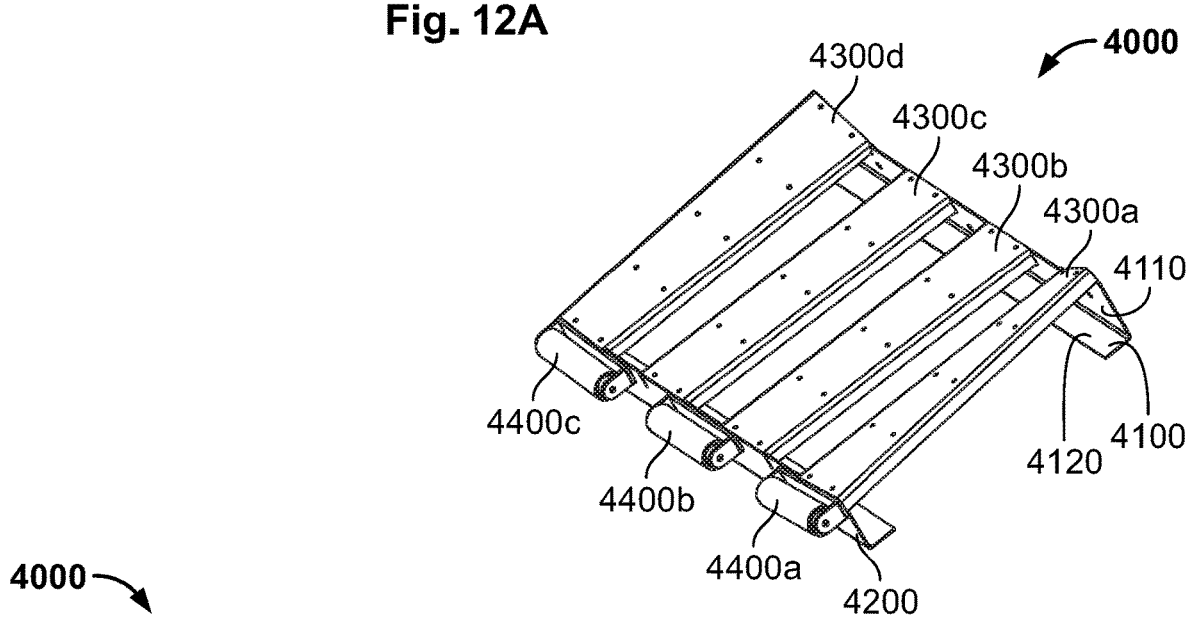
FIG. 12B is a top rear perspective view of the transition assembly of the bulk material conveyor of FIG. 1.
Figure 12C:
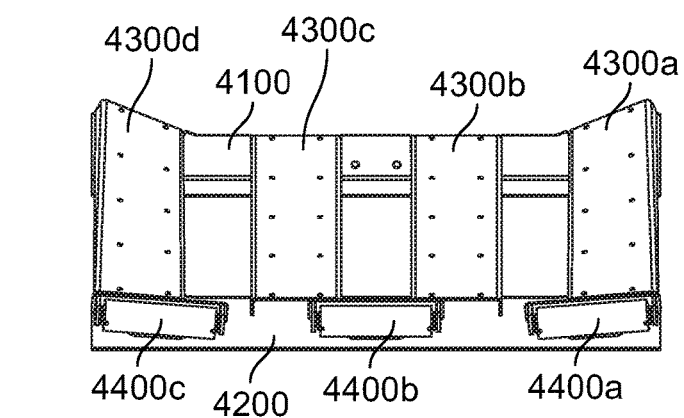
FIG. 12C is a rear end view of the transition assembly of the bulk material conveyor of FIG. 1.
Figure 12D:
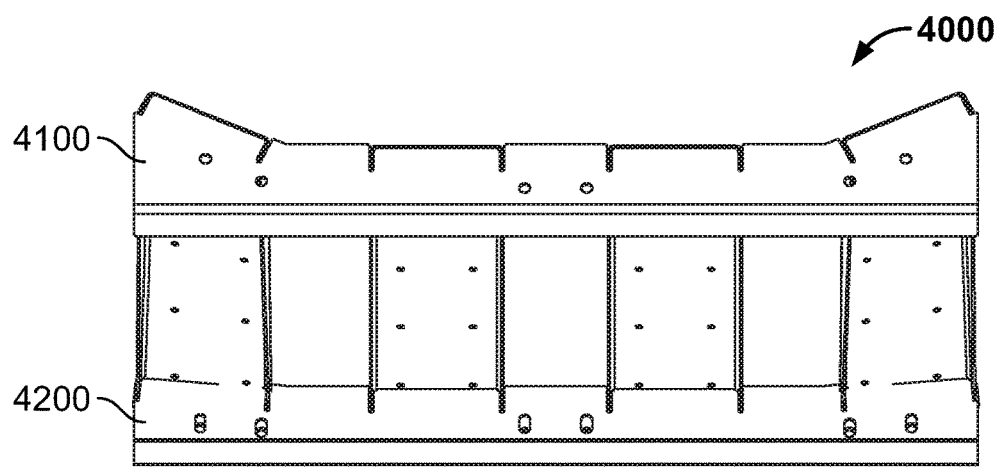
FIG. 12D is a front end view of the transition assembly of the bulk material conveyor of FIG. 1.
Figure 12E:
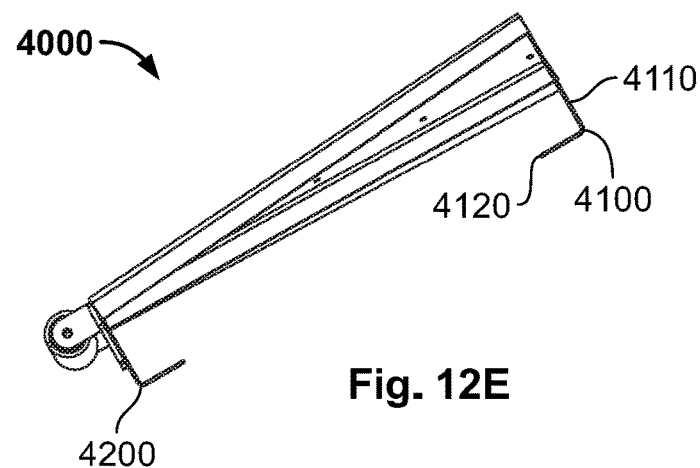
FIG. 12E is a first side view of the transition assembly of the bulk material conveyor of FIG. 1.
Figure 12F:
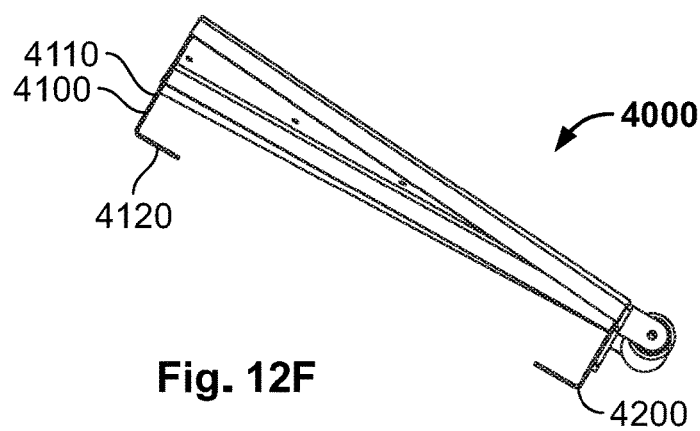
FIG. 12F is a second side view of the transition assembly of the bulk material conveyor of FIG. 1.
Figure 12G:
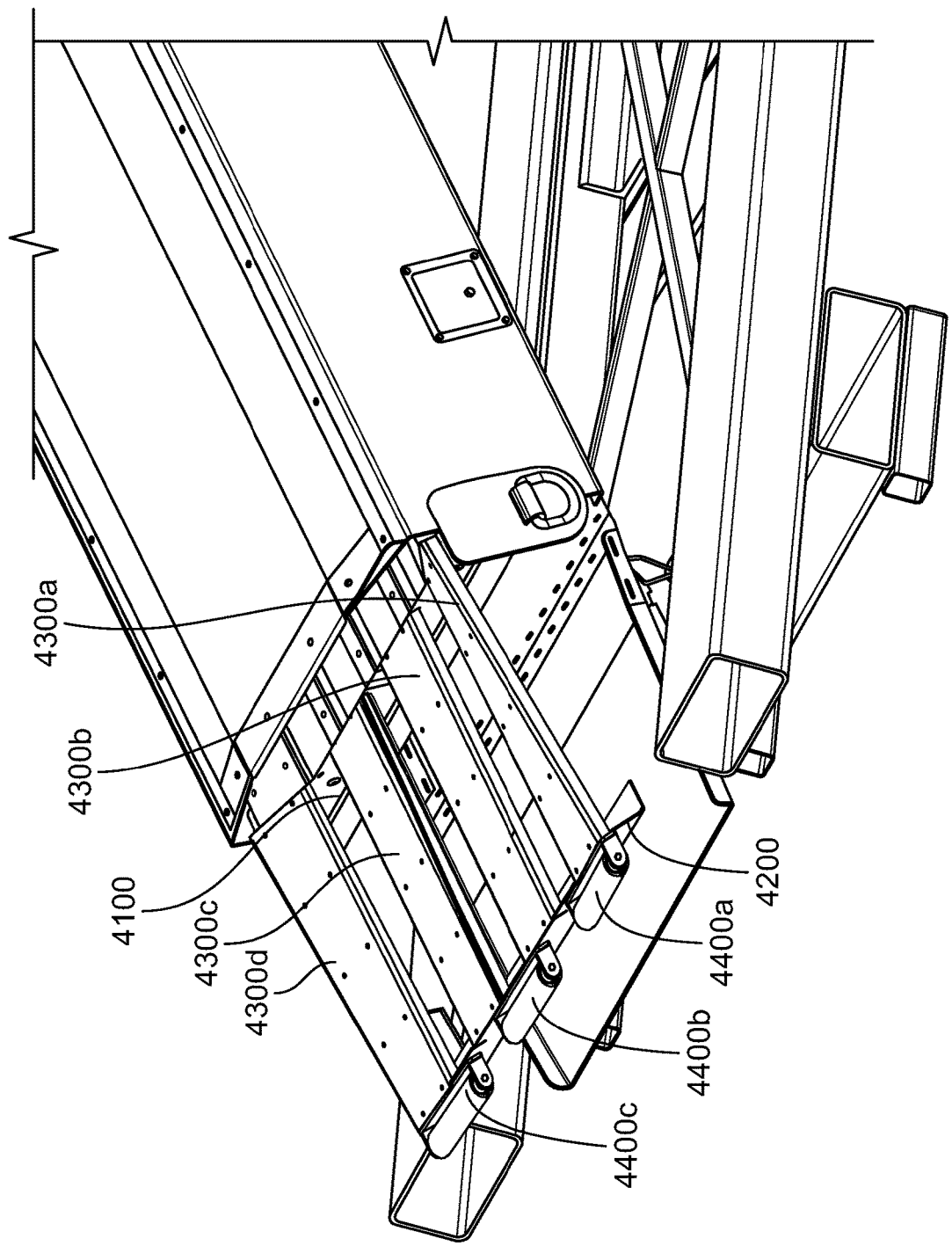
FIG. 12G is a fragmentary top rear perspective view of the transition assembly installed in the bulk material conveyor of FIG. 1.
Figure 12H:
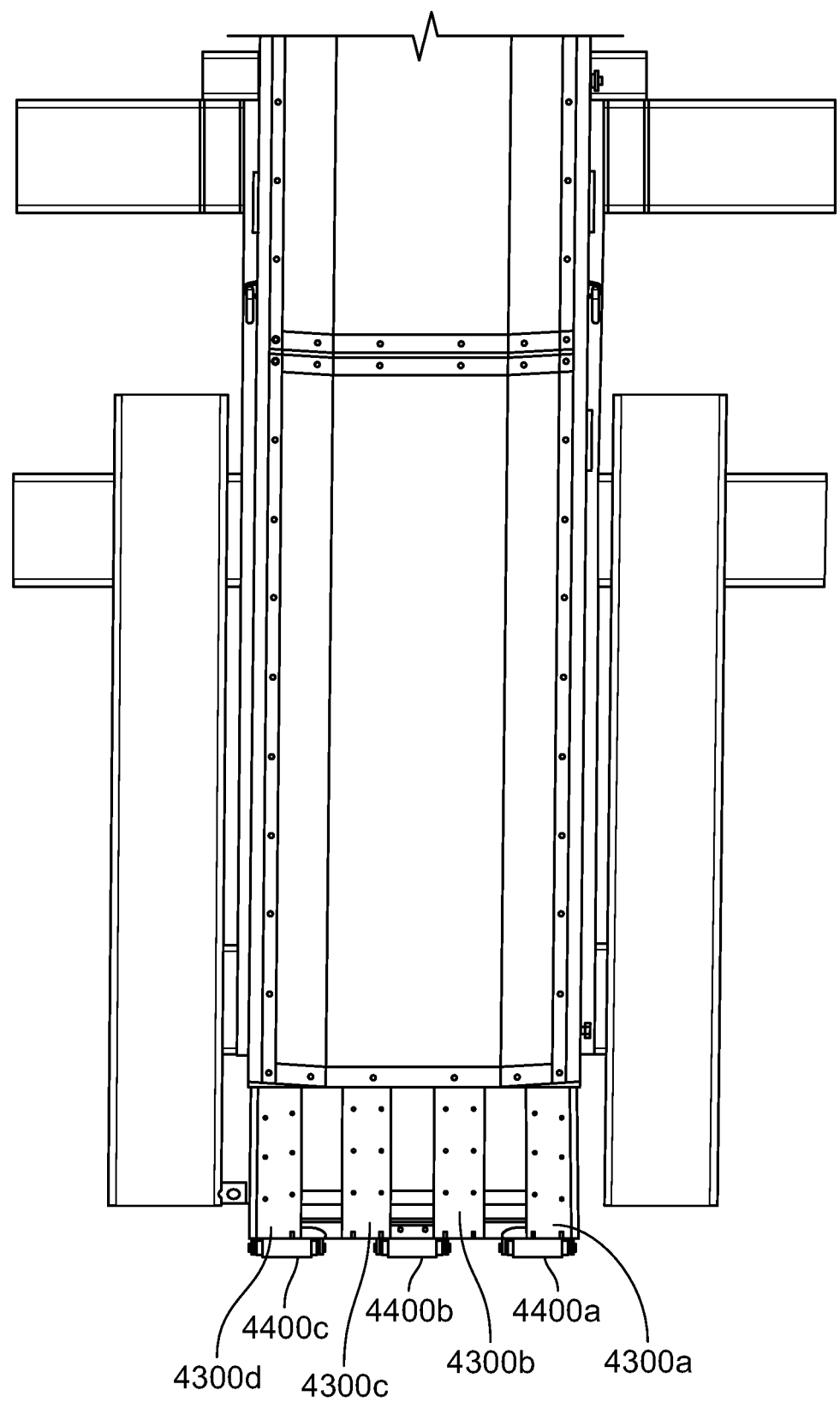
FIG. 12H is a top view of the transition assembly installed in the bulk material conveyor of FIG. 1.
Figure 13C:
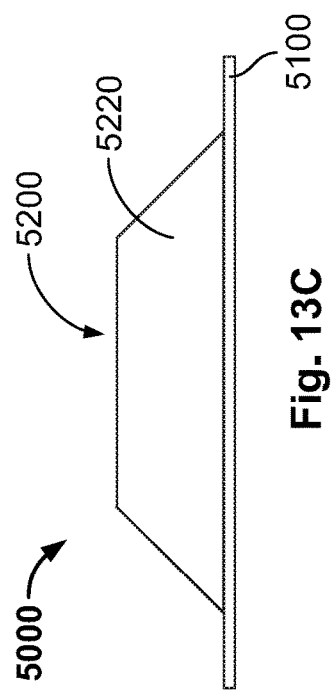
FIG. 13C is a front end view of the diverter assembly of the bulk material conveyor of FIG. 1.
Figure 13D:
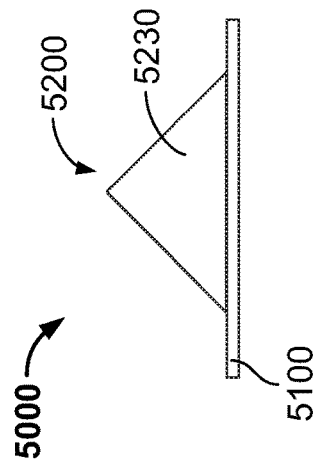
FIG. 13D is a first side view of the diverter assembly of the bulk material conveyor of FIG. 1.
Figure 13E:
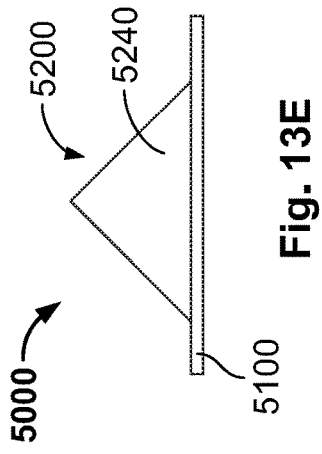
FIG. 13E is a second side view of the diverter assembly of the bulk material conveyor of FIG. 1.
Figure 13A:
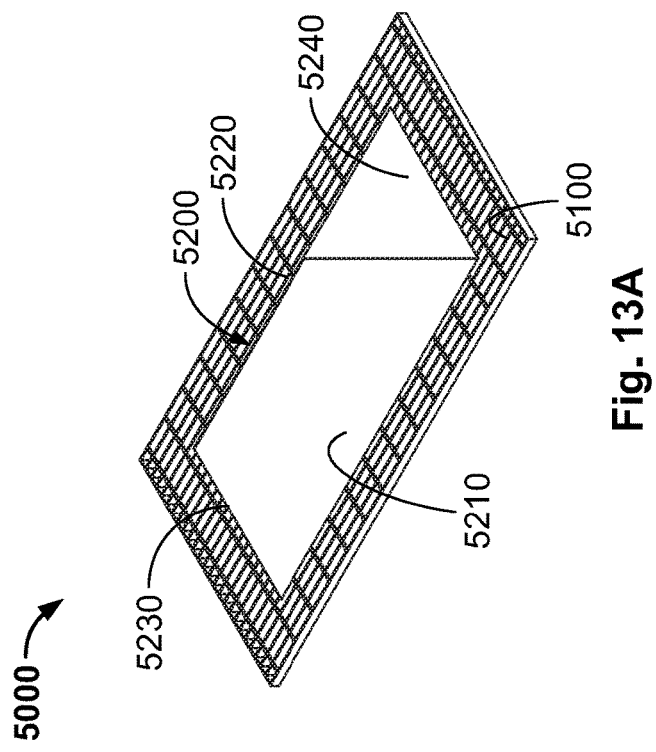
FIG. 13A is a fragmentary top front perspective view of the diverter assembly of the bulk material conveyor of FIG. 1.
Figure 13B:
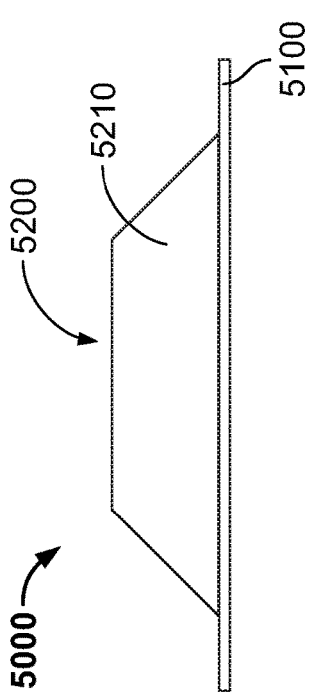
FIG. 13B is a rear end view of the diverter assembly of the bulk material conveyor of FIG. 1.

The first, second, third, and fourth conveyor supports 4300a-d are connected between the first and second lateral end supports 4100 and 4200. As best shown in FIGS. 12A-D, the conveyor supports 4300a-d are spaced apart from each other, including symmetrical gaps between all four conveyor supports. In addition, the outer most conveyor supports 4300a and 4300d each include a twist between the respective ends, such that the connection to the first lateral end support 4100 is rotated or angled with respect to the connection to the second lateral end support 4200 for each conveyor support 4300a and 4300d. In other words, the outer most conveyor supports 4300a and 4300d are each partially rotated about or angled with respect to or relative to the longitudinal axis 80 of the housing such that material dropped onto the transition assembly is diverted toward a center line of the conveyor belt assembly when the material contacts the outer most conveyor supports 4300a and 4300d. Specifically, for conveyor support 4300a, the connection to the first lateral end support 4100 is rotated counterclockwise about the longitudinal axis 80 of the housing 200, and with respect to the connection to the second lateral end support 4200, when viewed from a rear end of the transition assembly 4000 (such as shown in FIG. 12C). For conveyor support 4300d, the connection to the first lateral end support 4100 is rotated clockwise about the longitudinal axis 80 of the housing 200, and with respect to the connection to the second lateral end support 4200, when viewed from a rear end of the transition assembly 4000 (as best seen in FIG. 12C).

The first, second, and third rollers 4400a, 4400b, and 4400c are coupled to the outer face of the second lateral end support 4200. The rollers 4400a-c are configured to enable a conveyor belt of the conveyor belt assembly (not shown) to slide more easily, reducing friction, caused by material being dropped onto the end of the conveyor belt. The first and third rollers 4400a and 4400c are slightly rotated or angled with respect to horizontal. Specifically, the first roller 4400a is rotated or angled counterclockwise from horizontal, when viewed from a rear end of the transition assembly 4000 (such as shown in FIG. 12C). The third roller is rotated or angled clockwise from horizontal, when viewed from the rear end of the transition assembly 4000 (as best see in FIG. 12C). The second roller 4400b is horizontal, and rotates about a horizontal axis. The slight rotation or angling of the first and third rollers 4400a and 4400c with respect to horizontal, along with the slight rotation or angling of the conveyor supports 4300a and 4300d, enables the conveyor belt to have a slight concave curvature, biasing the material toward a center of the conveyor belt.

Diverter Assembly

Specific aspects of the diverter assembly 5000 are illustrated in greater detail with respect to FIGS. 13A, 13B, 13C, 13D, and 13E. However, certain aspects of the diverter assembly 5000 may be described with reference to other components or features of the bulk material conveyor 50, and, therefore, reference may be made to FIGS. 1-8 and the features illustrated therein as well.

The diverter assembly 5000 is positioned inside the receiver assembly 2200 of the hopper assembly 2000. The diverter assembly 5000 spreads material around an inside perimeter of the hopper assembly 2000, which reduces the likelihood of jamming or clogging of material. The diverter assembly 5000 also screens out contaminants.

The illustrated example diverter assembly 5000 includes a grate 5100 and a material diverter 5200.

The grate 5100 extends across an inside of the receiver assembly 2200 of hopper assembly 2000. The grate 5100 is rectangular, such that each side of the grate contacts an inner surface of the walls 210, 2220, 2230, and 2240 of the receiver assembly 2200. The grate 5100 includes a plurality of openings through which the material dropped into the hopper assembly 2000 passes.

The material diverter 5200 includes a solid or hollow body having a front face 5210, a rear face 5220, a first side face 5230, and a second side face 5240.

The front face 5210 is connected to the rear face 5220 along a top edge, to the first side face 5230 along a first side edge, to the second side face 5240 along a second side edge, and to the grate 5100 along a bottom edge. The front face 5210 has a trapezoid shape, wherein the first and second side edges are angled in toward a center of the material diverter 5200. The front face 5210 is also angled in toward a center of the diverter assembly 5000. The angle of the front face 5210 causes material dropped into the center of the hopper assembly 2000 to be diverted toward the front wall 2210 of the receiving assembly 2200, such that the material passes through the grate 5100 proximate the front wall 2210.

The rear face 5220 is connected to the front face 5210 along a top edge, to the first side face 5230 along a first side edge, to the second side face 5240 along a second side edge, and to the grate 5100 along a bottom edge. The rear face 5220 has a trapezoid shape, wherein the first and second side edges are angled in toward a center of the material diverter 5200. The rear face 5220 is also angled in toward a center of the diverter assembly 5000. The angle of the rear face 5220 causes material dropped into the center of the hopper assembly 2000 to be diverted toward the rear wall 2220 of the receiving assembly 2200, such that the material passes through the grate 5100 proximate the rear wall 2220.

The first side face 5230 is connected to the front face 5210 along a first side edge, to the rear face 5220 along a second side edge, and to the grate 5100 along a bottom edge. The first side face 5230 has a triangular shape, wherein the first and second side edges are angled in toward a center of the material diverter 5200. The first side face 5230 is also angled inward toward a center of the diverter assembly 5000. The angle of the first side face 5230 causes material dropped into the center of the hopper assembly 2000 to be diverted toward the first side wall 2230 of the receiving assembly 2200, such that the material passes through the grate 5100 proximate the first side wall 2230.

The second side face 5240 is connected to the front face 5210 along a first side edge, to the rear face 5220 along a second side edge, and to the grate 5100 along a bottom edge. The second side face 5240 has a triangular shape, wherein the first and second side edges are angled in toward a center of the material diverter 5200. The second side face 5240 is also angled inward toward a center of the diverter assembly 5000. The angle of the second side face 5240 causes material dropped into the center of the hopper assembly 2000 to be diverted toward the second side wall 2240 of the receiving assembly 2200, such that the material passes through the grate 5100 proximate the second side wall 2240.

The diverter assembly 5000 is symmetrical when viewed from above in this example embodiment, and may be otherwise configured in accordance with the present disclosure.

Various components and features described herein may be made from steel or any other suitably strong material. It should also be appreciated that various components are described as being connected to other components, and that these connections may be done via welding, fasteners, or any other fastening mechanism(s).

In some examples, the components, assemblies, and/or features disclosed herein may be configured to operate with a rectangular or square shaped container. However it should be appreciated that other shapes may be used as well, including, for example, containers having a conical shape.

It should be appreciated that the present disclosure may sometimes use the phrase "integrally connected" which for this illustrated example embodiment includes connected by welding. It should be appreciated that many of the different components can be connected in different or other suitable manners such as by suitable fasteners (which are not shown in the figures.).

It should be understood that modifications and variations may be effected without departing from the scope of the novel concepts of the present disclosure, and it should be understood that this application is to be limited only by the scope of the appended claims.

The claims are as follows:
1. A bulk material conveyor comprising:
a support assembly having an extension mechanism pivotally connected at a first end to first and second base members;
a housing connected at a first pivot to the first and second base members of the support assembly and connected at a second pivot to a second end of the extension mechanism, wherein the housing is configured to rotate with respect to the first and second base members for positioning a discharge end of the housing above an intake end of the housing;
a conveyor belt assembly partially positioned in the housing;
a motor assembly coupled to the conveyor belt assembly;
a hopper assembly disposed at the intake end of the housing and including a receiving assembly having a plurality of walls, and a movable flap extending above one of the plurality of walls;

a gate assembly interposed between the hopper assembly and the housing and including a door movable between an open position and a closed position; and a transition assembly including a plurality of spaced apart conveyor supports, wherein at least one of the spaced apart conveyor supports is rotated relative to a longitudinal axis of the housing.

2. The bulk material conveyor of claim 1, which includes a fork tine receiver assembly including two rear end fork tine receivers connected to the support assembly, and two side fork tine receivers connected to the support assembly.

3. The bulk material conveyor of claim 1, wherein the extension mechanism comprises a scissor linkage mechanism having a lower scissor member pivotally coupled at a first end to the first and second base members and an upper scissor member pivotally coupled at a first end to the housing, wherein a second end of the lower scissor member is pivotally coupled to a second end of the upper scissor member.

4. The bulk material conveyor of claim 1, which includes a diverter assembly connected to the hopper assembly.

5. The bulk material conveyor of claim 4, wherein the diverter assembly includes a grate positioned in the hopper assembly, and a material diverter extending upwardly from the grate.

6. The bulk material conveyor of claim 5, wherein the material diverter is substantially centered on the grate.

7. The bulk material conveyor of claim 5, wherein the material diverter includes an angled front face, an angled rear face, an angled first side face, and an angled second side face.

8. The bulk material conveyor of claim 1, wherein the hopper assembly includes a support structure including an upright support member, an angled support member, and a lateral connection member.

9. The bulk material conveyor of claim 1, wherein the receiving assembly of the hopper assembly includes a front wall, a rear wall, a first side wall, and a second side wall.

10. The bulk material conveyor of claim 9, wherein the receiving assembly of the hopper assembly includes one of:
a first side flap movably connected to the first side wall; and
a second side flap movably connected to the second side wall.

11. The bulk material conveyor of claim 9, wherein the receiving assembly of the hopper assembly includes:
a first side flap movably connected to the first side wall; and
a second side flap movably connected to the second side wall.

12. The bulk material conveyor of claim 9, wherein the receiving assembly of the hopper assembly includes:
a front flap extending upwardly from the front wall;
a rear flap extending upwardly from the rear wall;
a first side flap movably connected to the first side wall; and
a second side flap movably connected to the second side wall.

13. The bulk material conveyor of claim 1, wherein the housing includes a bottom wall, a top wall, a first side wall and a second side wall forming an enclosure around a conveyor belt of the conveyor belt assembly, wherein a discharge cover disposed at the discharge end of the housing.

14. The bulk material conveyor of claim 1, wherein the transition assembly includes:

a first lateral end support; and
a second lateral end support,
wherein the plurality of conveyor supports are connected between the first lateral end support and the second lateral end support.

15. The bulk material conveyor of claim 14, wherein the transition assembly includes one or more rollers coupled to the second lateral end support.

16. The bulk material conveyor of claim 1, wherein the transition assembly includes:
first, second, third, and fourth conveyor supports extending perpendicular to a transverse axis of the bulk material conveyor,
wherein the first and fourth conveyor supports are partially rotated about the longitudinal axis of the housing such that material dropped onto the transition assembly is diverted toward a center line of the conveyor belt assembly when the material contacts the first and fourth conveyor supports.

17. A bulk material conveyor comprising:
a support assembly;
a housing connected to the support assembly;
a conveyor belt assembly partially positioned in the housing;
a motor assembly coupled to the conveyor belt assembly;
a hopper assembly including a receiving assembly including a plurality of walls, and a movable flap extending above one of the plurality of walls;
a gate assembly including a door movable between an open position and a closed position;
a transition assembly including a plurality of spaced apart conveyor supports, wherein at least one of the spaced apart conveyor supports is rotated relative to a longitudinal axis of the housing; and
a fork tine receiver assembly including two rear end fork tine receivers connected to the support assembly, and two side fork tine receivers connected to the support assembly.

18. The bulk material conveyor of claim 17, wherein the two rear end fork tine receivers are parallel to a longitudinal axis of the bulk material conveyor, and wherein the two side fork tine receivers are parallel to a transverse axis of the bulk material conveyor.

19. A bulk material conveyor comprising:
a support assembly;
a housing connected to the support assembly;
a conveyor belt assembly partially positioned in the housing;
a motor assembly coupled to the conveyor belt assembly;
a hopper assembly including a receiving assembly having a front wall, a rear wall, a first side wall, and a second side wall, a front flap extending upwardly from the front wall, a rear flap extending upwardly from the rear wall, a first side flap movably connected to the first side wall, and a second side flap movably connected to the second side wall;
a gate assembly including a door movable between an open position and a closed position; and
a transition assembly including a plurality of spaced apart conveyor supports, wherein at least one of the spaced apart conveyor supports is rotated relative to a longitudinal axis of the housing.

20. The bulk material conveyor of claim 19,
wherein the receiving assembly of the hopper assembly includes one or more stabilizer rods connected to both the front flap and the rear flap.

* * * * *